Feb. 7, 1961 H. GANG 2,970,755
REGISTRATION CONTROL MEANS FOR ADDING-SUBTRACTING
LISTING MACHINES
Filed Oct. 25, 1956 21 Sheets-Sheet 1
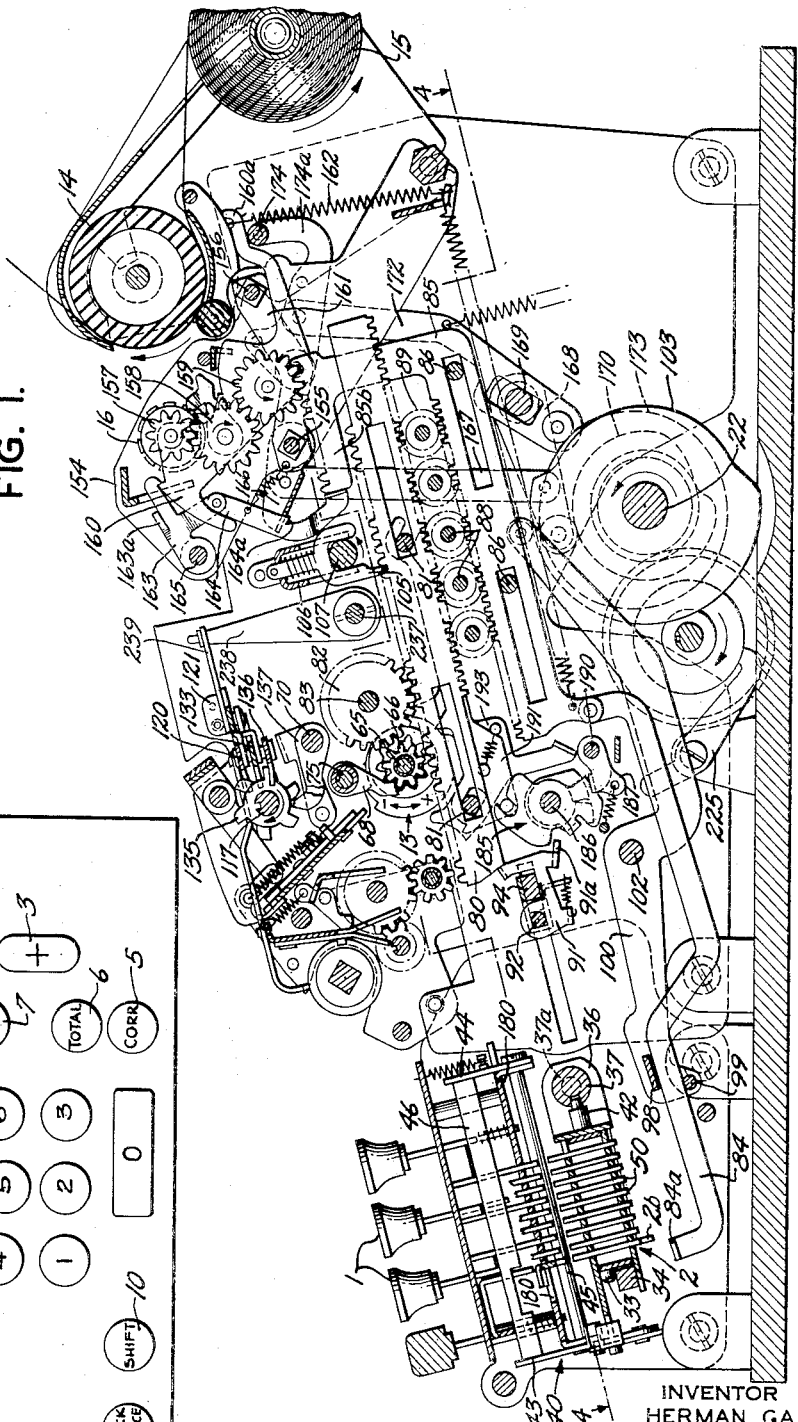
FIG. 1.
FIG. 2.
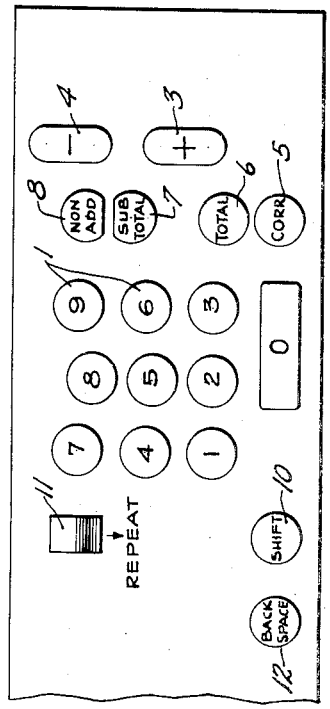
INVENTOR
HERMAN GANG
BY *George V. Hell*
ATTORNEY

INVENTOR.
HERMAN GANG
BY

ATTORNEY.

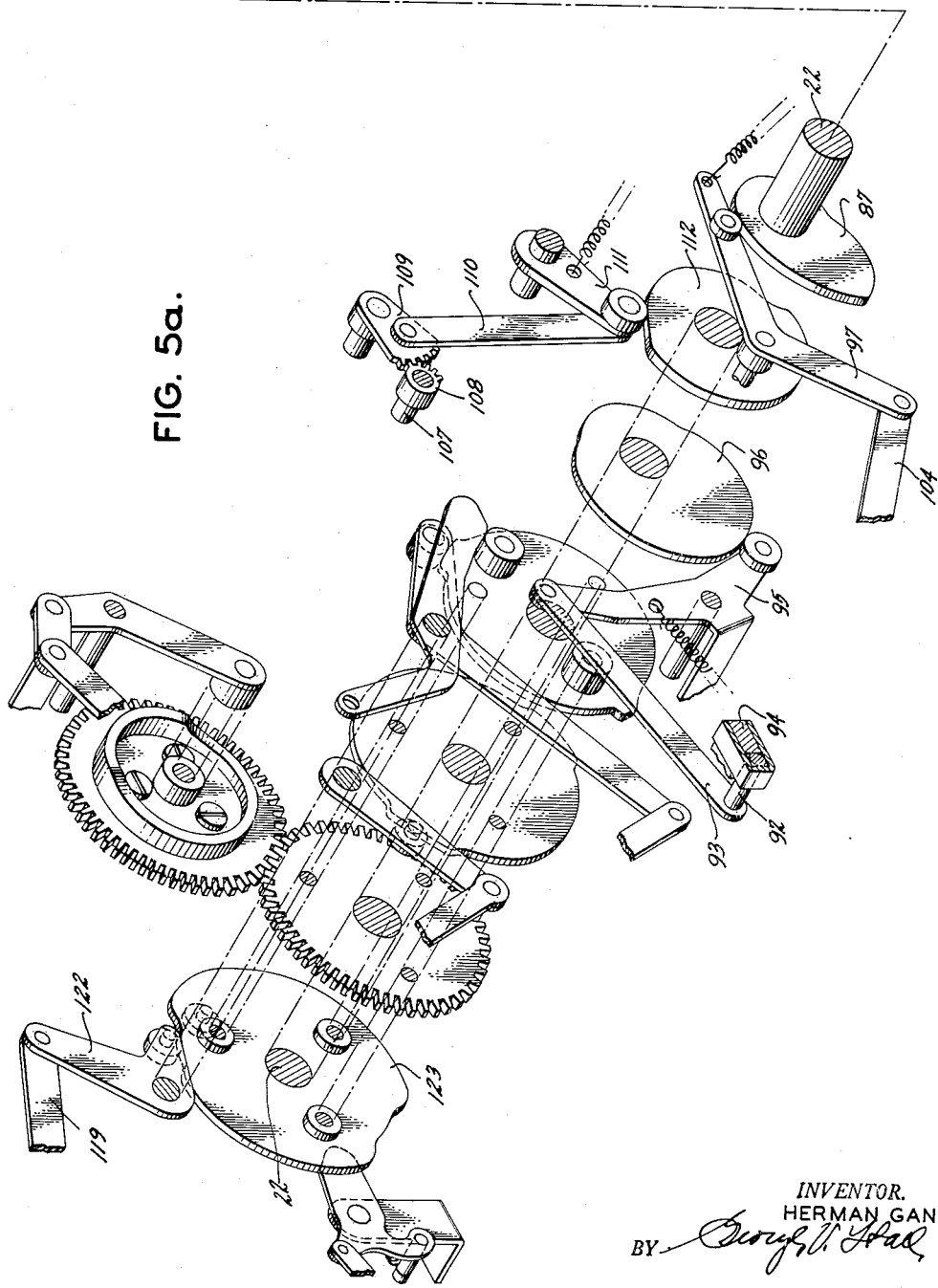

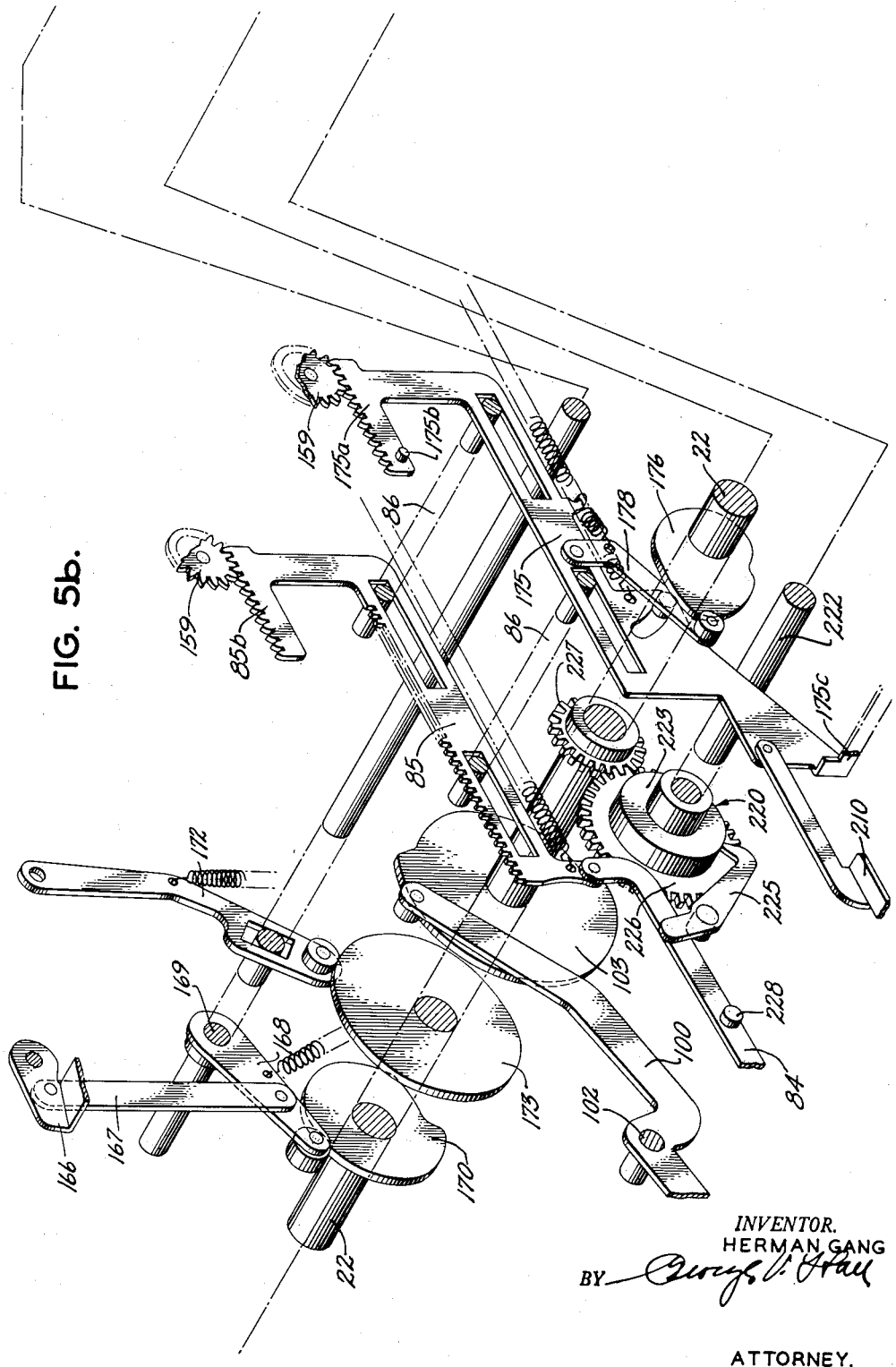

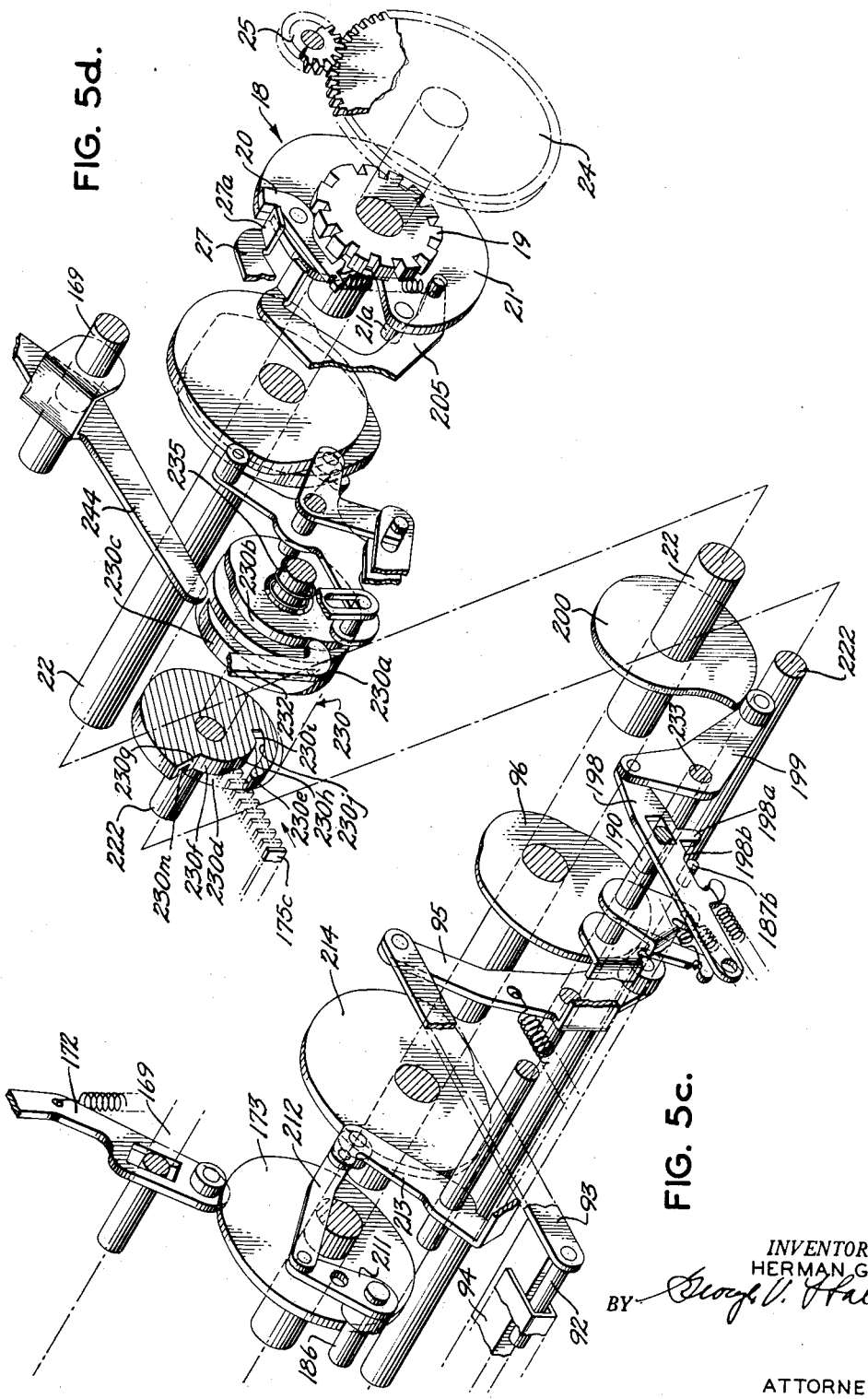

INVENTOR.
HERMAN GANG
BY
ATTORNEY

Feb. 7, 1961 H. GANG 2,970,755
REGISTRATION CONTROL MEANS FOR ADDING-SUBTRACTING
LISTING MACHINES
Filed Oct. 25, 1956 21 Sheets-Sheet 8

INVENTOR.
HERMAN GANG
BY
ATTORNEY.

INVENTOR.
HERMAN GANG
BY

ATTORNEY.

INVENTOR.
HERMAN GANG
BY
ATTORNEY

Feb. 7, 1961 H. GANG 2,970,755
REGISTRATION CONTROL MEANS FOR ADDING-SUBTRACTING
LISTING MACHINES
Filed Oct. 25, 1956 21 Sheets-Sheet 13

INVENTOR.
HERMAN GANG
BY George V. Hall
ATTORNEY

Feb. 7, 1961 H. GANG 2,970,755
REGISTRATION CONTROL MEANS FOR ADDING-SUBTRACTING
LISTING MACHINES
Filed Oct. 25, 1956 21 Sheets-Sheet 14

NORMAL ADJUSTMENT

ADJUSTMENT FOR ADDITION.

ADJUSTMENT FOR SUBTRACTION OR TOTAL.

ADJUSTMENT FOR SUB-TOTAL, NON-ADD OR CORRECTION

ADJUSTMENT FOR NEG. TOTAL OR NEG. SUB-TOTAL

INVENTOR.
HERMAN GANG
BY George V. Hall

ATTORNEY

INVENTOR.
HERMAN GANG
BY
ATTORNEY

INVENTOR.
HERMAN GANG
BY
ATTORNEY

INVENTOR
HERMAN GANG
BY
ATTORNEY

INVENTOR.
HERMAN GANG
BY

ATTORNEY

United States Patent Office 2,970,755
Patented Feb. 7, 1961

2,970,755

REGISTRATION CONTROL MEANS FOR ADDING-SUBTRACTING LISTING MACHINES

Herman Gang, Morris Plains, N.J., assignor to Monroe Calculating Machine Company, Orange, N.J., a corporation of Delaware Filed Oct. 25, 1956, Ser. No. 618,230

18 Claims. (Cl. 235—60.2)

This invention relates to adding-subtracting listing machines and more particularly to such machines having accumulators of the crawl tens transfer type.

The continuously engaged wheel to wheel gearing of crawl tens transfer mechanism offers a number of operational advantages in listing machines over jump type tens transfer accumulators. These advantages include quietness of operation, compactness of structure, the elimination of independently and intermittently operable mechanism, and inherent reversibility thereby eliminating the controls necessary in jump type transfer mechanism to provide for operation of the transfer mechanism upon both the initial and return strokes of the usual actuator racks.

In contradistinction to the above-noted operational advantages of crawl tens transfer accumulators, their use has necessitated, in prior art listing machines, relatively time consuming operations in the performance of certain of the machine functions. These functions are concerned primarily with total taking operations and particularly with the taking of true negative totals and subtotals which involve three and four subtractive machine cycles respectively. These operations are fully disclosed in Patents No. 2,645,417 and No. 2,658,669. In the machines of these patents, the actuator racks are effective during either the initial or the return stroke of each registering cycle of operation, depending on the sign of registration, and are moved idly during the opposed stroke. During the initial strokes of the racks, the type are moved to printing line position and then restored during the return stroke.

The devices of the present invention materially increase the speed with which the above referred to total taking operations are effected in a listing machine having an accumulator of the crawl transfer type. To achieve this result, the actuator racks of the registering mechanism which are effective during a single stroke and idle during the opposed stroke during each cycle of additive or subtractive registration may be rendered operable to effect a complete registering operation of like sign on both the initial and return stroke (hereinafter termed double stroke registration as distinguished from single stroke) of each cycle of operation. It will be evident, therefore, that the true negative total taking operations may be effected by a reduced number of machine cycles. Furthermore, the invention provides improved mechanisms for successively zeroizing the numeral wheels from lower to higher orders, which operation is necessary in the total taking operations from a crawl transfer type accumulator. These mechanisms operate broadly according to the principles disclosed in Patent No. 2,261,341.

The invention is disclosed as embodied in a listing machine of the ten key type; however, it will be evident that the devices of the invention are equally applicable to the full keyboard type listing machine disclosed in the aforenoted patents. In addition to the novel registration control devices which facilitate the total taking operations, the machine includes improved means for performing the other usual functions of a listing machine. The invention, however, will best be understood from the following detailed description with reference to the accompanying drawings in which:

Fig. 1 is a longitudinal section through the machine showing the registering and printing mechanism.

Fig. 2 is a plan view of the keyboard.

Figs. 5a, 5b, 5c and 5d are an exploded perspective of the main machine drive shaft and associated mechanism.

Fig. 12a is a right side fragmentary view of parts shown in Fig. 12.

*General arrangement*

Figure 3:
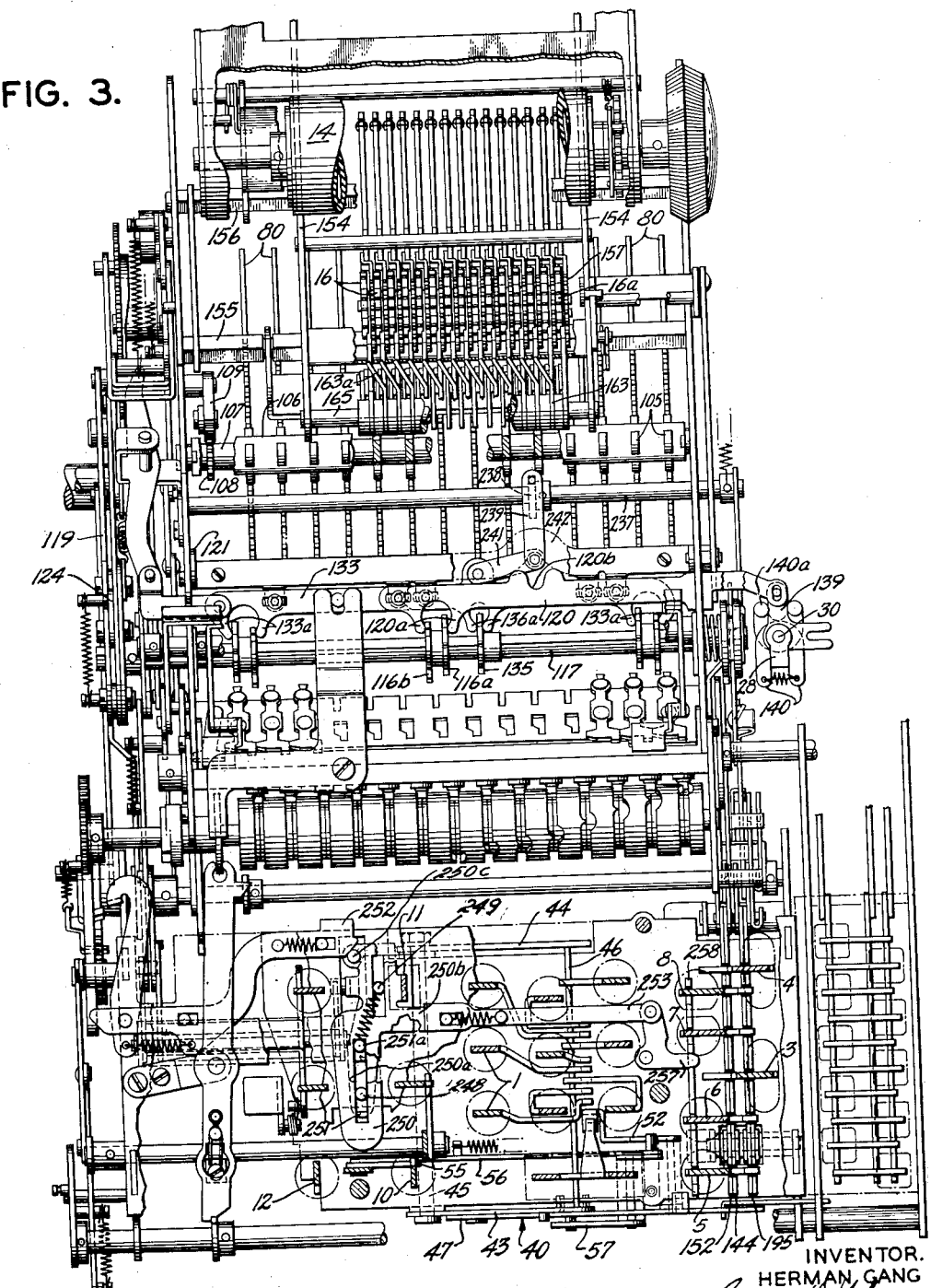
Fig. 3 is a plan view of the machine with the casing and keyboard removed and with parts in section.

The machine has at its front the usual keyboard (Figs.

1 and 2) which is common to ten key type listing machines. The keyboard includes a grouping of freely retractable numeral keys 1 of the digital values 0 to 9 inclusive for controlling entry of selected values into a conventional type pin carriage 2 which is located beneath the keyboard. An add key 3 and a subtract key 4 are located to the extreme right of numeral keys 1, and between the numeral keys and the add-subtract keys is a row of keys including a correction key 5, a total key 6, a subtotal key 7, and a non-add key 8. To the left of the numeral key grouping is a shift key 10, a repeat key 11, and a back space key 12.

A crawl tens transfer type accumulator register designated generally by the reference numeral 13 (Figs. 1 and 4) extends transversely of the machine and is operated by rack type actuating mechanism which is controlled by novel mechanism of the invention in accordance with values entered in the pin carriage.

At the rear of the machine is the usual platen 14 and paper roll 15 (Figs. 1 and 3). Forwardly of platen 14 are type wheels 16 which are adjusted under control of the registering mechanism and operated in timed relation therewith.

Machine drive

The machine is driven by a motor 17 (Fig. 4) through a main clutch 18 located outwardly of the machine right side frame. The motor may be continuously operated or it may be engaged in well-known manner in response to depression of any one of a number of machine function keys which are operable to engage the clutch as hereinafter described. Clutch 18 (Fig. 5d of the perspective view comprising Figs. 5a, 5b, 5c and 5d) is of well-known construction in which the driving member comprising a toothed wheel 19 is adapted for engagement by a spring urged pawl 20 mounted on the driven member 21 of the clutch. The driven member 21 of the clutch is fast on a main drive shaft 22 on which a plurality of cams (hereinafter described) for performing various of the machine functions are mounted. Fixed for rotation with the driving member 19 which is rotatably mounted on shaft 22 is a spur gear 24 which is engaged by a pinion 25. Pinion 25 is driven from the motor by a pulley and belt transmission 26 (Fig. 4) to thereby drive driving member 19 of the clutch.

Figure 6:
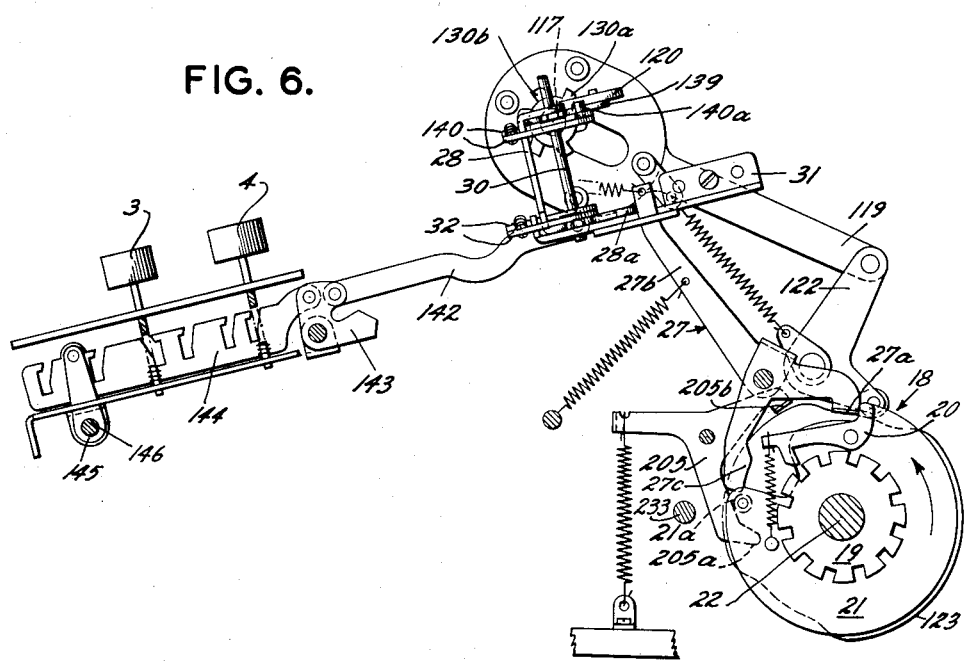
Fig. 6 is a side elevation of the add and subtract keys with mechanism for controlling the main clutch.
Figure 7:
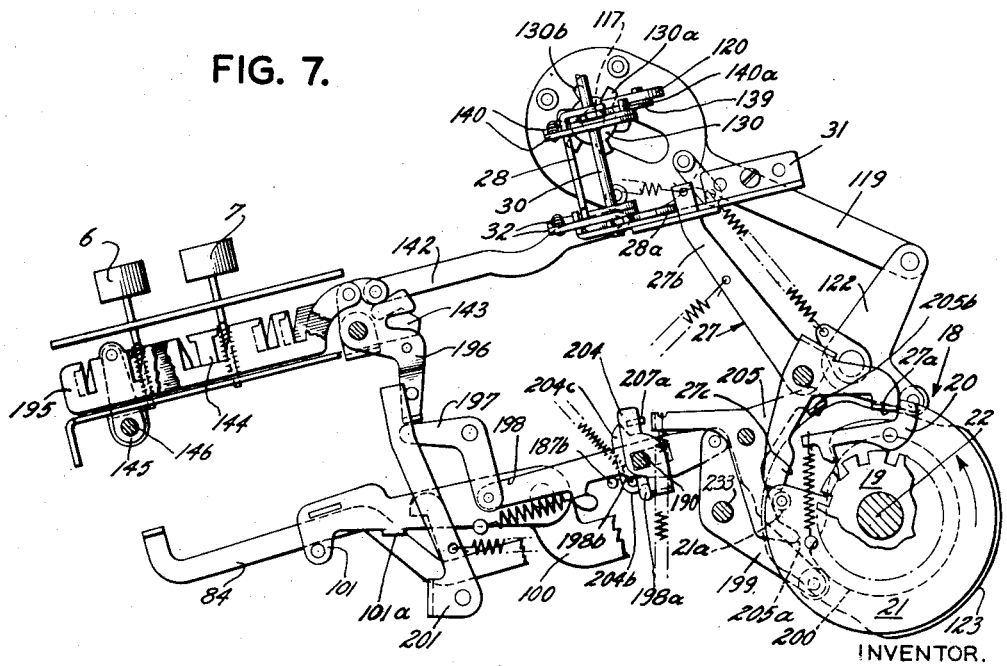
Fig. 7 is a side elevation of the total and subtotal keys with mechanisms for controlling the main clutch.
Figure 8:
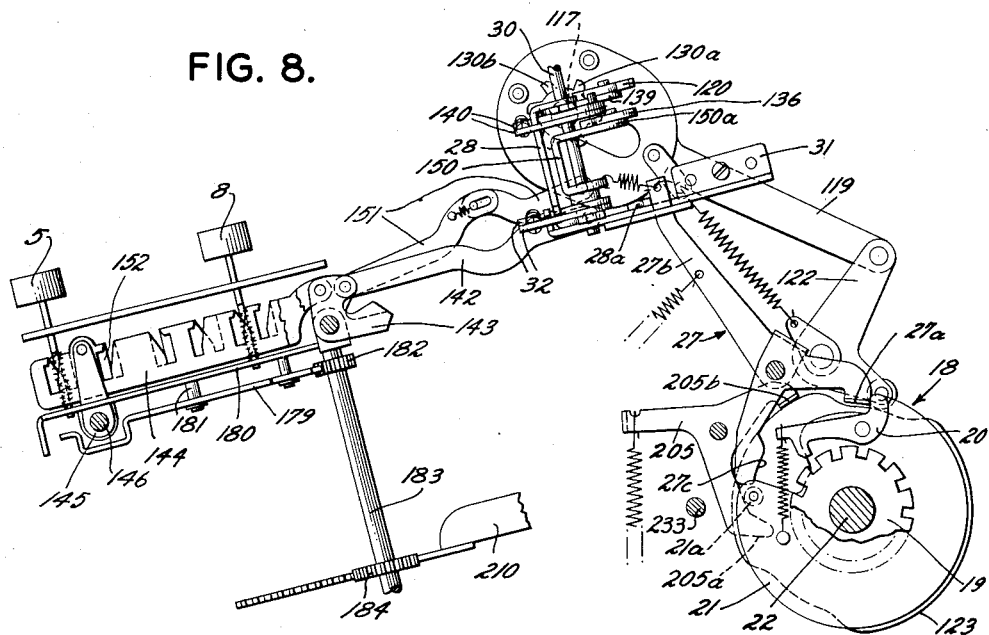
Fig. 8 is a side elevation of the correction and non-add keys with mechanism for controlling the main clutch.
Figure 12:
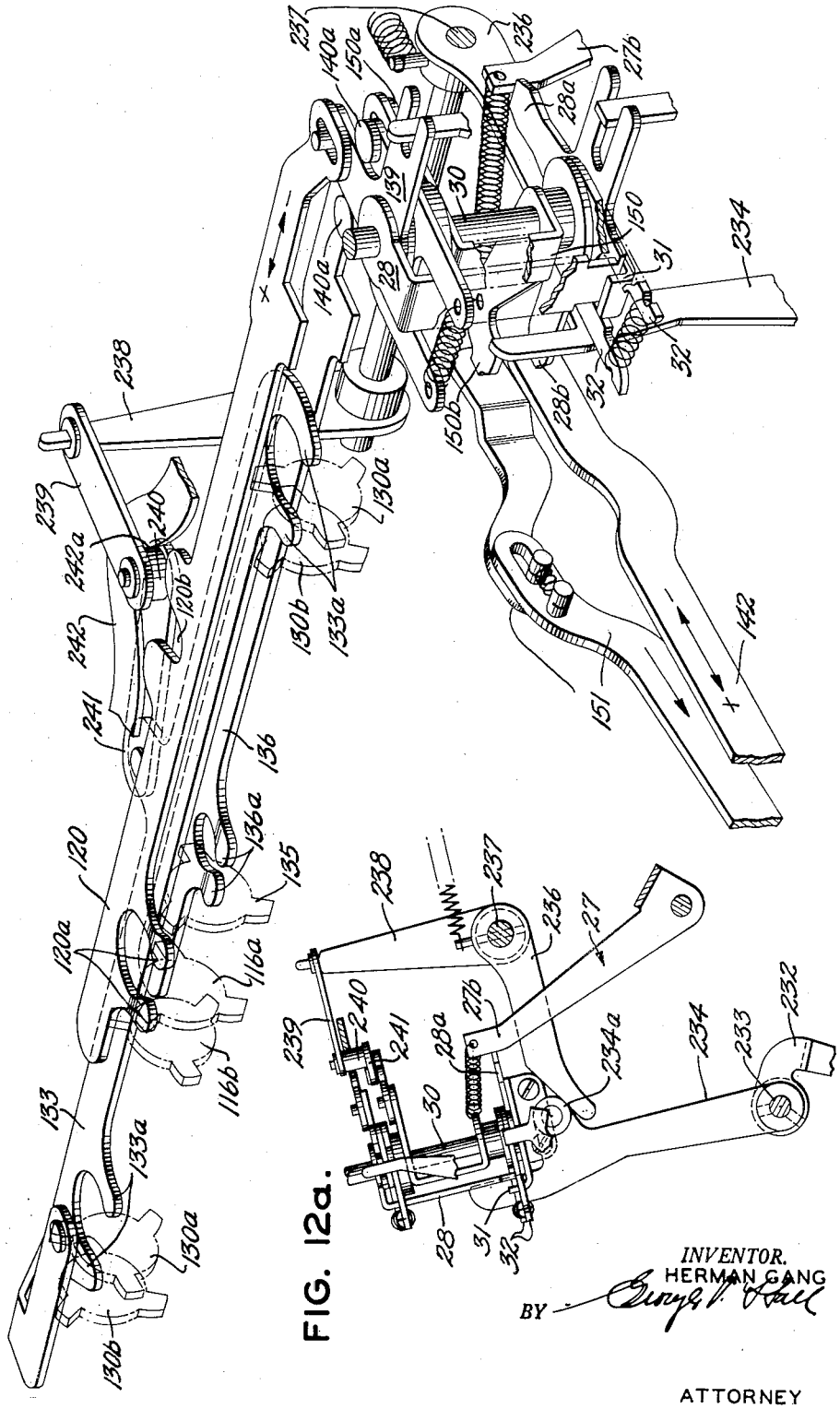
Fig. 12 is a perspective view of the sign control mechanism for the single and double stroke registering mechanism.

Normally pawl 20 is held, against the tension of its spring, in clutch disengaging position by a lug 27a at the end of one arm of a three armed lever 27 as shown in Figs. 6, 7 and 8. Lever 27 is spring urged counterclockwise and is normally restrained from such movement by engagement of the upper end of an upstanding arm 27b thereof with the end of a horizontally disposed lower arm 28a of a pivotally mounted U-shaped yoke 28 as best shown in Figs. 12 and 12a.

Yoke 28 is pivotally mounted at its horizontal lower arm 28a and at the end of its opposed upper arm on a vertical shaft 30 which is supported by a bracket 31 secured on the machine right side frame. A pair of scissor arms 32 have common pivotal mounting on shaft 30 adjacent the upper face of arm 28a of yoke 28 and normally are spring urged one toward the other to engage the opposite sides of an upstanding lug of bracket 31. The vertical portion of yoke 28 connecting its two horizontal arms is of the same width as the lug of bracket 31 and normally is engaged by the inner edges of the opposed arms of scissors 32 as they engage the sides of said lug. Yoke 28 is therefore yieldably held in a centralized position by scissor arms 32. In the normal centralized position of yoke 28, the end of its arm 28a will be engaged by the end of arm 27b to hold lever 27 in clockwise clutch disengaging position.

Clutch 18 will be engaged upon pivotal movement of yoke 28 in either direction (Fig. 12) by control means hereinafter described. Upon pivotal movement of yoke 28, the end of its arm 28a will be removed from engagement with arm 27b of lever 27. Lever 27 will then be moved counterclockwise from the position shown in the drawings to remove lug 27a from engagement with pawl 20. Pawl 20 will then be moved into engagement with driving member 19 of the clutch to complete the drive to driven member 21. Means for rocking yoke 28 to engage the clutch drive is hereinafter described in connection with the various machine functions.

During operation of clutch 18 (Figs. 6, 7 and 8), the counterclockwise positioned arm 27b of lever 27, by engagement with one side or the other of arm 28a, will restrain yoke 28 in rocked position. However, if yoke 28 is released by the control means which initially effected the rocking operation thereof, clutch 18 will be disengaged at the end of the current cycle of operation as follows. As the clutch approaches full cycle position, a pin 21a on the driven member 21 will engage an arm 27c of lever 27 thereby rocking said lever clockwise to normal position. Clockwise movement of lever 27 will move arm 27b thereof from engagement with the side of arm 28a of yoke 28 which will then be centralized by scissor arms 32. As clutch 18 completes its cycle of operation, lug 27a will be engaged by pawl 20 to disengage the clutch drive. Furthermore, upon movement of the clutch to full cycle position, pin 21a will be moved beyond arm 27c as shown in Figs. 6, 7 and 8 thus releasing lever 27. However, lever 27 will be restrained in normal clutch disengaging position by engagement of its arm 27b with the end of arm 28a of centralized yoke 28. Should yoke 28 be held in rocked position upon release by arm 27b by the control means which effected the initial rocking operation, lever 27 will be immediately rerocked counterclockwise after release by pin 21a as the clutch moves to full cycle position and lug 27a will not engage pawl 20. The clutch, therefore, will not be disengaged and will remain continuously engaged until the end of a cycle of operation in which yoke 28 is released by the control means.

Digital value selection

Figure 4:
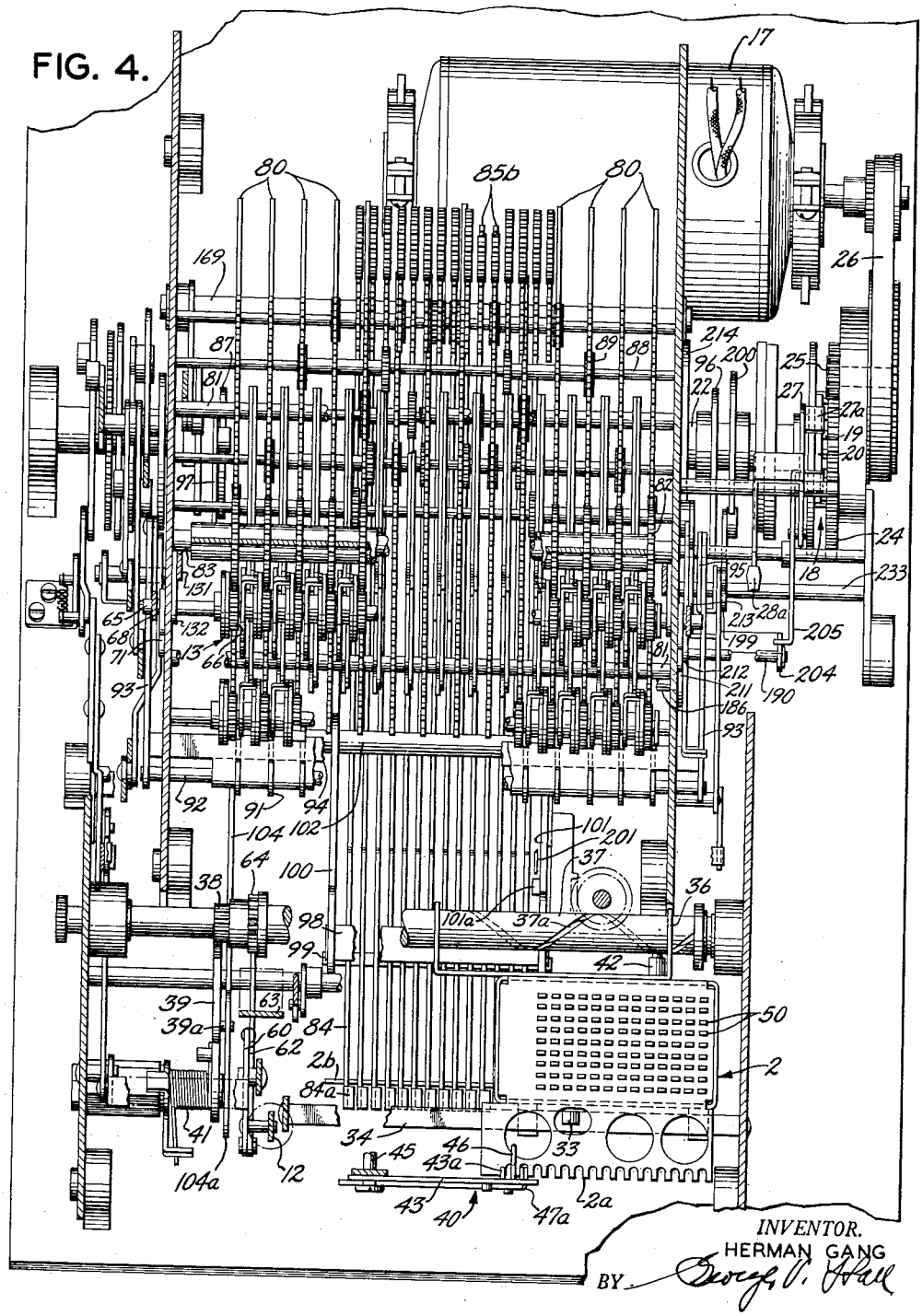
Fig. 4 is a plan view taken on line 4—4 of Fig. 1.

The pin carriage 2 (Figs. 1, 4 and 10) is transversely shiftable beneath the keyboard of the machine. The carriage is supported at its front by a roller 33 which rides on a rail 34, and at its rear the carriage is supported by a bracket 36 which is slidably mounted on a worm shaft 37 of the carriage shifting mechanism. Worm shaft 37 is suitably journaled in the machine side frames, and fixed thereon inwardly of the left side frame is a pinion 38. Engaging pinion 38 is a segmental drive gear 39 which is pivotally mounted forwardly of worm shaft 37 (Figs. 4 and 11). A torsion spring 41 biases gear 39 counterc'ockwise thereby urging pinion 38 and worm shaft 37 clockwise. At the rear of carriage 2 is a pin 42 which engages the worm 37a of shaft 37. Worm 37a is directionally threaded so that clockwise movement of shaft 37 will shift pin carriage 2 toward the left.

Normally pin carriage 2 is held in its right end position (Figs. 4 and 10) against the urge of worm shaft 37 by an escapement 40. Escapement 40 comprises a pair of spaced arms 43 and 44 (Figs. 1, 3 and 10) extending transversely of the machine at the front and rear respectively of the pin carriage. The arms have common pivotal mounting at their left ends on a rearwardly extending shaft 45 and are connected at their right ends by a bail 46 below the keyboard. The escapement is spring biased counterclockwise with bail 46 engaging a horizontal extension of each of the stems of numeral keys 1.

Figure 10:
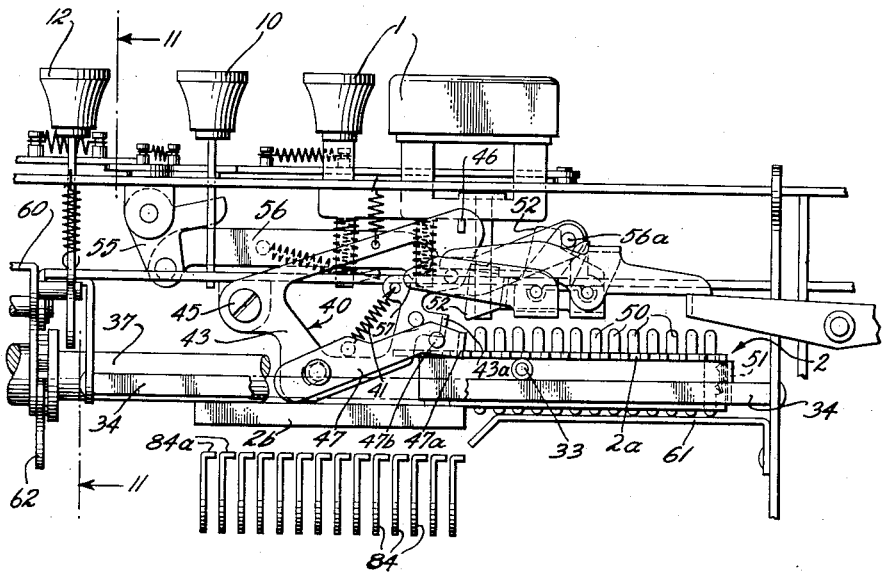
Fig. 10 is a fragmentary front elevation of the pin carriage and associated mechanisms.
Figure 11:
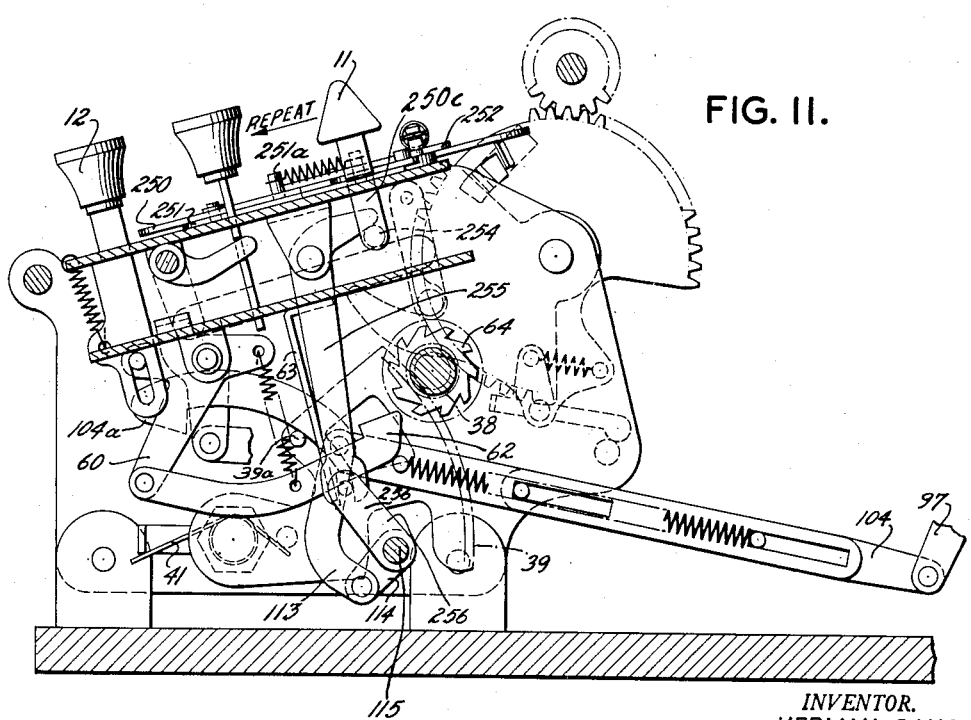
Fig. 11 is a fragmentary vertical section taken on line 11—11 of Fig. 3.

Attached at the front of pin carriage 2 its a rack 2a (Figs. 4 and 10). Normally engaging a tooth of rack 2a is the pallet 47a at the right end of an arm 47 of escapement 40. Arm 47 has pin and slot mounting adjacent its left end on the front face of arm 43 of the escapement and is spring urged toward the right and counterc'ockwise against a stop on arm 43. Normally pallet 47a by engagement with a tooth of rack 2a restrains carriage 2 from movement toward the left against the urge of worm shaft 37. The urge of carriage 2, however, moves arm 47 of the escapement toward the left to the limit of its pin and slot mounting on arm 43. A second pallet of the escapement comprises a lug 43a of arm 43 located over the next tooth space toward the left of rack 2a.

Upon depression of any one of the numeral keys 1, the key stem by engagement with bail 46 will rock escapement 40 clockwise from the position shown in Fig. 10. Upon clockwise movement of escapement 40, pallet 43a of arm 43 will engage the tooth space of rack 2a over which it was positioned, and following this engagement, pallet 47a of arm 47 will be moved from engagement with its tooth space of the rack. It will be noted that upon depression of a numeral key carriage 2 will be released by one pallet and held by the other so that no leftward movement will be afforded carriage 2. However, upon movement of pallet 47a from its tooth space, arm 47 will be released from the urge toward the left by carriage 2 and its spring will be effective to move said arm toward the right to the limit of its slot and pin mounting. This movement will bring pallet 47a under the next tooth space toward the right. Upon release of the depressed numeral key, the escapement 40 will be restored counterclockwise. This movement will first move pallet 47a into engagement with the tooth space under which it was positioned and then remove pallet 43a from engagement with its tooth space. The pin carriage will now be released and its urge toward the left will be sufficient to overcome the spring of arm 47 which will be moved toward the left to the limit of its slot and pin mounting thereby permitting one ordinal shift of the pin carriage toward the left.

Pin carriage 2 (Figs. 1, 4 and 10) includes the usual ordinal rows of pins 50. Pins 50 are held in raised or depressed position by detent springs 51. Each row of pins 50 includes nine pins corresponding to the values 0 to 8 inclusive. These pins are set in depressed position upon depression of the corresponding numeral keys 1 and as hereinafter described, control the excursions of the rack type actuators of the registering mechanism. There is no pin 50 to control registration for the digit 9. For this reason only the pin carriage escapement is operated upon depression of numeral key 1 for the digit 9, thereby providing for operation of the registering mechanism to the full extent of its movement for said digit 9 registration.

The ends of the stems of 0 to 8 numeral keys 1 are aligned from front to rear according to a row of pins 50 of carriage 2. When carriage 2 is in its right end position, the ends of the stems of keys 1 are positioned above the upper ends of the leftmost row of corresponding pins 50 of the pin carriage. With the exception of the zero numeral key 1, the stems of the key are slightly above the upper ends of the corresponding pins 50 of the associated pin row. Therefore, upon depression of the digital value key corresponding to one of the valves 1 to 8, the corresponding pin in the associated key row will be adjusted to depressed position; and, upon release of the key, carriage 2 will be shifted one step toward the left, as heretofore described, to position the next lower ordinal pin row beneath the ends of the stems of the numeral keys.

The zero pins 50 of the carriage may be set by depression of zero numeral key 1 or by alternatively operable means hereinafter described. Interposed between the end of the stem of the zero numeral key and the zero pin 50 of the associated key row is the leftwardly extending end of an arm of a crank 52 (Figs. 3 and 10). Crank 52 is normally spring held in clockwise position with the end of its arm a slight distance above the zero pin of the associated key row and a lug at its upper edge engaged with the end of the stem of the zero key 1. Therefore, upon depression of the zero key, crank 52 will be rocked counterclockwise thereby moving zero pin 50 to its depressed position. The alternate operation of crank 52 is effected independently of zero key 1 in a carriage shifting operation hereinafter described.

Provision must be made to disable the accumulator actuators to the left of and out of control range with respect to the pin rows of carriage 2. The disabling means comprises an arm 2b (Figs. 4 and 10) extending toward the left from the left side of the carriage. Arm 2b is in the vertical plane of zero pins 50 of the pin rows and extends downwardly to the plane of the ends of pins when in set depressed position. Arm 2b, therefore, performs the same function as set zero pins 50. When carriage 2 is in its normal right end position, arm 2b is in position to disable the complete ordinal series of actuators. As the carriage is step shifted toward the left in response to setting of the pin rows, arm 2b will be moved from controlling position with respect to the successive lower order actuators as the successive higher order pin rows are moved into controlling position.

*Carriage shifting*

After entry of a digital value into one or more rows of pins 50 of carriage 2, it may be necessary to shift the carriage to the left end position to properly locate the set pins with respect to the actuators of the registering mechanism. In this instance, the lower order zero pins 50 to the right of the set pins must be set to prevent operation of the associated lower orders of the actuating mechanism. This operation could be effected by repeated depression of the zero numeral key 1. However, to facilitate the operation, pin carriage 2 is adapted to be shifted to its left end position in response to depression of shift key 10 (Figs. 2, 3 and 10).

Shift key 10, which is located to the left of the numeral key grouping, has a shoulder on its stem overlying an arm of a bell crank 55 which is located beneath the keyboard. A link 56 extends toward the right from crank 55 and has pivotal connection including a pin 56a with an upstanding arm of a crank 57. Extending toward the left is an arm of crank 57 which overlies a pin 47b on arm 47 of escapement 40. Link 56 is spring urged toward the right thereby normally positioning crank 55 counterclockwise and crank 57 clockwise as shown in Fig. 10.

Upon depression of shift key 10, crank 55 will be rocmked clockwise (Fig. 10) thereby moving link 56 toward the left and rocking crank 57 counterclockwise. Upon counterclockwise movement of crank 57, the leftwardly extending arm thereof will engage pin 47b thereby rocking escapement arm 47 clockwise and releasing pin carriage 2 from restraint thereby. Furthermore, upon counterclockwise movement of crank 57, pin 56a will engage an arm of crank 52 in the path of movement thereof and rock said crank counterclockwise. Upon release of pin carriage 2, it will be shifted directly to its left end position by the urge of worm shaft 37 and during the shifting operation the successive lower order zero pins 50 will be engaged by crank 52 thereby setting said pins in depressed position. Upon release of the shift key, the parts will be restored with pallet 47a engaging a tooth space of rack 2a of the pin carriage.

*Back spacing*

Means are operable to back space pin carriage 2 in response to depression of key 12 (Figs. 2, 4, 10 and 11). The stem of back space key 12 has slot and pin connection with a crank 60 which is mounted on the under side of a partition plate below the keyboard. The slot and pin connection permits crank 60 to be operated independently of key 12 for back space operations not concerned with the present invention. Pivotally attached to a depending arm of crank 60 is a finger 62. Finger 62 is spring urged counterclockwise (Fig. 11) and is guided by a comb 63. A ratchet wheel 64 is fixed on worm shaft 37 to the right of pinion 38 (Fig. 4). Normally the free end of finger 62 is positioned forwardly of ratchet wheel 64. Upon depression of back space key 12, crank 60 will be rocked counterclockwise thereby moving finger 62 toward the rear of the machine. Upon movement of finger 62 toward the rear, its free end will engage a tooth of ratchet wheel 64 thereby rotating said wheel and worm shaft 37 counterclockwise to shift the pin carriage to the right.

The movement of the pin carriage to the right upon depression of key 12 is substantially equal to two ordinal positions. However, upon release of the key, the carriage will be reversely moved one ordinal position. From an inspection of Fig. 10, it will be noted that pallet 47a is inclined rightwardly from the perpendicular with respect to rack 2a of pin carriage 2. In the first ordinal step of movement of the pin carriage, arm 47 of the escapement, because of its yieldable slot and pin mounting, will move toward the right with rack 2a. This movement will bring arm 47 to the limit allowed by its slot and pin mounting on arm 43. During the second ordinal step of movement of the pin carriage toward the right, the tooth of rack 2a engaging inclined pallet 47a will cam arm 47 downwardly against its spring to disengage said pallet. As carriage 2 completes its second step of movement, the next tooth space of rack 2a will be brought into registration with pallet 47a thereby permitting arm 47 to be moved counterclockwise by its spring to engage said pallet with said tooth space. Upon release of back space key 12, ratchet wheel 64 will be released and yieldable arm 47 of the escapement will permit carriage 2 to be reversely moved one ordinal position.

If, in a back spacing operation, a row of pins 50 is restored to the right out of controlling position with respect to the registering mechanism (hereinafter described), any pin set in that row will be restored. As each successive row of pins 50 is moved toward the right out of range of the registering mechanism, the lower ends of the set pins will be engaged with a cam plate 61 (Fig. 10) thereby restoring said pins to their normal raised position. It will be noted that this engagement of the pins with cam plate 61 is not effected until the second ordinal step of movement in a back space operation. Therefore, when the pin carirage is reversely moved toward the left one ordinal step upon release of back space key 12, pins 50 of the restored row will be moved out of range of plate 61 so that another setting of that pin row may be effected. As will be described hereinafter, means operable in connection with motor operation of the machine is provided to restore the pin carriage.

The accumulator and adjustable mounting means

The crawl tens transfer accumulator 13 (Figs. 1, 4 and 13) is of the type disclosed in Patent #1,828,180 as modified by Patent #2,450,787. The ordinal units of the accumulator, each including a digital input gear 66, are rotatably mounted on a shaft 65. The highest order accumulator unit comprises an overflow unit which is adapted to receive tens transfer from the next lower order unit which unit is the highest in which digital registration is effected.

Shaft 65 of the accumulator is supported by an adjustable linkage which is controlled to effect relative adjustment between the actuating mechanism (hereinafter described) and said accumulator to determine the sign of registration and the type of registration (single or double stroke). The adjustable linkage comprises a pair of vertically disposed links 68 which at their lower ends support the opposite ends respectively of accumulator shaft 65. At their upper ends, links 68 are pivotally suspended at the forward ends of a pair of horizontally disposed arms 69. Arms 69 are fixed at their rear on a cross shaft 70 which is rotatably mounted in the machine framing. Inwardly of the ends of accumulator shaft 65 is a pair of fixed plates 71, each having a guid slot 71a engaged by said shaft and comprising a vertical section and a horizontal section extending rearwardly from said vertical section. A pair of springs 73 (Fig. 13) are attached to the ends of shaft 65, and forwardly and upwardly therefrom the springs are attached at their other ends to the machine framing. Links 68 are therefore biased clockwise about their pivotal connections on arms 69 by the forward pull of springs 73, and arms 69 with shaft 70 on which said arms are fixed are also biased clockwise by the upward pull of said springs. Because of the forward and upward bias of springs 73, accumulator shaft 65 normally will engage guide slots 71a at the intersection of their vertical and rearwardly extending horizontal portions to locate the accumulator in raised and forward position in which position it is disengaged from the actuating mechanism. As will be hereinafter described, accumulator shaft 65 may be adjusted in the vertical or in the horizontal sections of said guide slots 71a to determine the sign and type of registration.

Means comprising a detent arm 74 (Figs. 13, 15 and 16) is provided to prevent rotation of each accumulator unit when the accumulator is in normal disengaged position. One end of each detent 74 is fast on a shaft 75, the ends of which are pivotally supported by links 68 intermediate their ends. A forwardly extending arm 76 is fixed at its rear on shaft 75 and adjacent its forward end has a cam slot 76a engaging a fixed pin 77. Upon either downward or rearward movement of accumulator 13 to engage the actuators, as hereinafter described, arm 76 will be controlled at its forward end by slot 76a in engagement with fixed pin 77 to rotatably adjust shaft 75 with respect to links 68 thereby disengaging detents 74 from accumulator gears 66.

The digital actuators

Positioned below and in the vertical plane of each accumulator gear 66 is an actuator rack 80 (Figs. 1, 4, 13, 15 and 16). Actuator racks 80 are supported for longitudinal movement by a pair of cross shafts 81 engaging longitudinal slots in the racks. To the rear of each accumulator gear 66 and meshed with the associated rack 80 is a reversing gear 82 rotatably mounted on a cross shaft 83. Normally gears 66, as shown in Fig. 1, are disengaged from both racks 80 and reversing gears 82. Control means (hereinafter described) is selectively operable to engage accumulator gears 66 with racks 80 before either the initial or the return stroke of each registering cycle of operation and to disengage said gears after said stroke. The opposed stroke of the actuator racks therefore will be idle. This constitutes the heretofore noted single stroke registration. Alternatively, the control means is operable to engage accumulator gears 66 with either racks 80 or with reversing gears 82 before the initial stroke, and before the return stroke to disengage said gears and engage them with the reversing gears or with the racks respectively. This constitutes the double stroke registration in which like sign registration may be effected during both strokes of each cycle of operation.

Means for controlling the excursions of each actuator rack 80 comprises a stop arm 84 (Figs. 1, 4, 9 and 10) adapted for engagement with set pins 50 of respectively associated pin rows of carriage 2. For this reason, arms 84 are spaced according to the spacing of the pin rows which spacing is in accordance with the spacing of the type wheels 16 (Figs. 1 and 4) of the printing mechanism. Since the spacing of racks 80 is in accordance with the greater spacing of gears 66, converging means is employed to connect arms 84 with the respective racks. Such converging means is fully disclosed in Patent #2,389,182. The converging means comprises a series of intermediate racks 85 spaced in accordance with the spacing of stop arms 84. Racks 85 are supported for longitudinal movement beneath racks 80 on cross shafts 86 which engage longitudinal slots in the racks. To the front ends of racks 85, the rear ends of the respective stop arms 84 which extend toward the front of the machine are pivotally connected. Integral with each rack 85 at its rear is an upstanding arm which has at its upper end an auxiliary rack 85b which adjusts an associated type wheel 16 of the printing mechanism (hereinafter described).

Rotatably mounted and extending transversely between racks 80 and 85 is a crossover shaft 88 for each pair of said racks. A gear 89 fixed on the crossover shaft engages a lower set of teeth on rack 80 of the pair, and a gear 90 fixed on the shaft engages rack 85. Thus, longitudinal movement imparted to a rack 85 in one direction will be effective through a pair of transmission gears 89 and 90 to transmit longitudinal movement in the opposite direction to a corresponding rack 80.

The actuator drive

Each rack 85 is spring biased toward the rear of the machine thereby urging the associated actuator rack 80 forwardly. Normally each pair of racks 80 and 85 are restrained from longitudinal movement by a column latch 91 (Fig. 1) which engages the forward end of rack 80. Column latches 91 are pivotally mounted on a transverse shaft 92 which is mounted at its ends at the forward ends of a rearwardly extending pair of links 93 (Figs. 4, 5a, 5c and 14). Extending transversely above latches 91 to the rear of shaft 92 and fixed at its ends to links 93 is a square shaft 94. Each latch 91 is spring biased counterclockwise and normally engages the under side of shaft 94 and is thereby located in holding position with respect to the associated rack 80 as shown in Fig. 1.

Each link 93 is connected at its rear to the upper end of one of a pair of cam followers each comprising a lever 95. Followers 95 are fulcrumed outwardly from the respective right and left machine side frames and are each spring biased counterclockwise (Figs. 5a and 5c) clockwise (Fig. 14) to engage cam 96 which is fixed on the machine main drive shaft 22.

Cams 96 are of like contour and when the machine is in full cycle position, cam followers 95 are engaged by the high portions of cams 96 and are thereby rocked in position to hold latches 91 and the associated racks 80 toward the rear of the machine. During the first half of each cycle of operation of main clutch 18, cams 96 will be rotated to engage their low portions with followers 95. This will permit latches 91 to be moved toward the front of the machine by the spring urged followers 95 and during the last half of the cycle the latches will be restored. The forward movement of latches 91 is of an extent which will permit forward movement of actuator racks 80 to positions determined by the selection mechanism as hereinafter described. As the latches are restored toward the rear, the racks will be reengaged in their various operated positions and thereby restored with said latches. There is a dwell of the high and of the low portions of cams 96 which are engaged by followers 95 when the registering mechanism is in full cycle and in midcycle positions respectively. Reference is made to graph line (a) of timing chart (Fig. 29A) for the time relationship of the actuator rack movement to the other machine operations hereinafter described.

Operation of the actuators under control of the digital value selection mechanism At the front free end of each rack stop arm 84 (Figs. 1, 4, 5b and 10) is a lug 84a which is normally positioned a slight distance forwardly of zero pins 50 and of arm 2b of pin carriage 2, and adjusted to a position below the horizontal plane of the lower edge of said arm 2b to which plane the lower ends of pins 50 are moved upon depression.

Means for adjusting stop arms 84 to lowered disabled and to raised enabled positions comprises a pair of transverse bails 98, 99 between which said arms are supported intermediate their ends. Bails 98, 99 are fixed at their left ends (Figs. 1 and 4) at the front end of a rearwardly extending lever 100, which is fast on a rotatably mounted cross shaft 102. At their right ends, the bails are fixed at the front end of a rearwardly extending arm 101 which at its rear is fast on cross shaft 102 on which opposed lever 100 is fast. Lever 100 and the connected parts are spring biased clockwise (Figs. 1 and 5b) to engage an antifriction roller at the rear of said lever with a cam 103 fast on machine drive shaft 22. When the machine is in full cycle position, lever 100 and the connected parts are held counterclockwise as shown in Figs. 1 and 5b. Arms 84, therefore, will be held in lowered disabled position.

Arms 84, as noted in connection with intermediate racks 85, are spaced in accordance with the spacing of the rows of pins 50 of carriage 2. When carriage 2 is in its right end position, the leftmost or highest order row of pins 50 is one ordinal position to the right of the rightmost or lowest order stop arm 84, and in position to be set upon depression of a numeral key 1. Therefore, as the pin rows are set from higher to lower orders and the pin carriage is step shifted toward the left, the set pin rows will be brought into controlling position with respect to stop arms 84 from lower to higher orders.

During the first dwell of the actuator driving means which occurs at the beginning of a machine cycle, cam 103 will be rotated counterclockwise from the position shown in Figs. 1 and 5b to engage its low portion with the roller of lever 100. The timing of this operation is shown by graph line (b) of Fig. 29A. Lever 100 comprising the cam follower and opposed arm 101 will, therefore, be spring rocked clockwise to raise arms 84 to enabled position. The dwell of the low portion of cam 103 will be engaged with follower 100 during the forward movement of actuator racks 80 in response to forward movement of latches 91 by the actuator drive.

Upon forward movement of racks 80, lugs 84a of stop arms 84 which are to the left and out of control range of the pin carriage will immediately engage arm 2b extending to the left from the carriage. For this reason substantially no registering movement will be afforded these actuator racks 80. However, arms 84 within the range of the pin carriage will be moved rearwardly to engage their lugs 84a with the set pins of the associated pin rows. Therefore, the associated actuator racks 80 respectively will be afforded digital actuating movements toward the front of the machine of extents corresponding to the values of set pins 50 of the carriage. It will be recalled that the pin rows remain unset for the control of registration of the digit 9. In this instance, the maximum excursion of a rack 80 for the registration of the digit 9 is determined by cross shafts 81 which act as limit stops by engagement with the ends of the mounting slots of said rack.

During the midcycle dwell of the actuator rack driving means, follower 100 will be reengaged by the high portion of cam 103 thereby lowering stop arms 84 to normal position. This will permit pin carriage 2 to be restored to the right, as hereinafter described, during the time in which actuator racks 80 are restored rearwardly to normal position.

At the time stop arms 84 are lowered from controlling position with respect to pin carriage 2, latches 91 will be in their forward position and disengaged from the ends of racks 80 which have been arrested in intermediate forward positions. Therefore, means must be provided, when stop arms 84 are lowered, to prevent racks 80 from being driven forwardly by their springs from the positions in which they were arrested by stop arms 84 under control of the pin carriage. Such means comprises a yieldable alignor 105 (Figs. 1 and 3) which engages each actuator rack 80 and which also operates to definitely locate said rack to align a corresponding type wheel 16 for a printing operation hereinafter described.

Alignors 105 are urged downwardly by individual springs in a transverse swinging frame 106 which is suspended at its ends from a pair of ears which are pivotally mounted to the machine side frames. The alignors are recessed at their under sides and are there engaged by a common eccentrically mounted cross shaft 107. A gear 108 (Fig. 5a) is fast on shaft 107 adjacent its left end and engaged with said gear is a segmental gear 109. Extending downwardly from gear 109 is a drive link 110 which is connected at its lower end to the end of a cam follower comprising a crank 111. Follower 111 is spring urged counterclockwise to engage a cam 112 fast on drive shaft 22.

When the machine is in full cycle position, cam follower 111 is engaged by the rise between the high and the low portions of cam 112. This position of the parts adjusts eccentric shaft 107 to the position shown in Fig. 1 in which alignors 105 are adjusted against the tension of their springs part way from aligning position. During the dwell of the driving means for the actuator rack drive at the beginning of a machine cycle, the low portion of cam 112 will be moved to engage follower 111. Follower 111 will therefore be rocked counterclockwise (Fig. 5a) to move link 110 downwardly and rotate segmental gear 109 counterclockwise, and gear 108 and eccentric shaft 107 clockwise. Upon clockwise movement of eccentric shaft 107 from the position shown in Figs. 1 and 5a, alignors 105 will be moved forwardly and upwardly from engagement with racks 80 to permit the forward registering operation of said racks. During the midcycle dwell of the actuator drive, the high portion of cam 112 will be effective to rock follower 111 clockwise. This will rotate eccentric shaft 107 counterclockwise to swing alignors 105 toward the rear and simultaneously to permit their downward movement under urge of their springs. Thus, the alignors will be engaged with a tooth space of the associated rack to effect the aligning operation.

The printing operation is performed during the midcycle dwell of the actuator drive and subsequent to the aligning operation. During the return rearward movement of column latches 91 to restore actuator racks 80, the high portion of cam 112 will dwell so that alignors 105 will remain in effective position thereby preventing forward movement of said racks after release from control of the pin carriage. As racks 80 are engaged and restored by the respective column latches 91, spring urged alignors 105 will be cammed upwardly by the teeth of said racks. This operation is effected by a cam face at the lower front end of the lower and operating end of each alignor. During the dwell of the actuator drive upon movement to full cycle position, the rise between the high and low portions of cam 112 will reengage follower 111 to part way adjust alignors 105 from effective position. Reference is made to graph line (c) of the timing chart of Fig. 29A for the timing of this operation.

Immediately after stop arms 84 have been lowered from registration controlling position with respect to pin carriage 2 as shown in Fig. 1, means is operable to restore said carriage to its right end position. This operation is effected while the actuator racks 80 and stop arms 84 are being restored and is completed an appreciable time before the end of the machine cycle. This will permit entry of a new value into the pin carriage for a subsequent calculation before the completion of the current operation.

The carriage return means comprises a cam 87 (Figs. 4, 5a and 11) fast on a drive shaft 22. Engaged with cam 87 is a cam follower comprising a bell crank 97. A forwardly extending arm 104 is pivotally attached at its rear to a depending arm of cam follower 97. The forward free end of arm 104 terminates in a hooked end 104a (Fig. 11). To the rear of its hooked end 104a arm 104 is supported by a link 113 which extends downwardly and at its lower end is pivotally attached to a crank 114 fast on a shaft 115. Crank 114 is not concerned with the present carriage return operation but is operable in connection with a repeat operation hereinafter described.

Underlying arm 104 to the rear of hooked end 104a is a pin 39a on segmental drive gear 39 of the carriage shifting mechanism. When carriage 2 is in its normal right end position, pin 39a is rearwardly of hooked end 104a a distance to permit counterclockwise movement of gear 39 from the position shown in Fig. 11 without bringing said pin into engagement with said hooked end, as carriage 2 is shifted toward its left end position.

Normally follower 97 is engaged with the low portion of cam 87 (Fig. 5a) and will dwell on said low portion until stop arms 84 (Fig. 1) are lowered to inactive position. Immediately thereafter the high portion of cam 87 will rock follower 97 counterclockwise thereby moving arm 104 toward the rear of the machine. Rearward movement of arm 104 will engage its hooked end 104a with pin 39a of segmental gear 39 thereby rotating said gear clockwise to the position shown in Fig. 11. The clockwise movement of gear 39 will rotate the worm shaft of the carriage shifting mechanism to shift said carriage to its normal right end position shown in Fig. 10. As the machine completes its cycle of operation, cam 87 will be rotated to reengage its low portion with follower 97 thereby permitting clockwise movement (Fig. 5a) of said follower by its spring to restore arm 104 toward the front of the machine. The timing of the carriage operation is illustrated by graph line (d) of timing chart Fig. 29A.

As carriage 2 is restored toward its right end position arm 47 of escapement 40 (Fig. 10) will be cammed from engagement with the successive teeth of rack 2a of carriage 2 as described in connection with the back spacing mechanism. Furthermore, the successive order pin rows will be moved into engagement with cam plate 61 to restore pins 50 also as described in connection with the back space mechanism.

It will be noted from an inspection of Fig. 11 that carriage return arm 104 comprises a yieldable linkage. This yieldable linkage is operable in connection with constant factor mechanism not concerned with the present invention but fully disclosed in applicant's copending application Serial No. 618,231, filed on even date herewith.

*Control of the actuators to effect additive or subtractive registration (single stroke)*

The accumulator input gears 66 (Figs. 1, 3, 13, 15, 16 and 17a) are rotated counterclockwise in additive registration and clockwise in subtractive registration. In an additive cycle of registration actuator racks 80 are moved idly during their forward excursions in accordance with values entered in pin carriage 2. During the dwell of the actuator rack drive before the return stroke of said actuators, means is operable to move accumulator 13 downwardly to engage gears 66 with the associated racks 80 so that during the return stroke counterclockwise registering operation of said gears is effected. During the dwell at the end of the registering cycle accumulator 13 will be moved upwardly to disengage gears 66.

Subtractive operation of racks 80 is effected by engagement of accumulator gears 66 before the forward stroke of said racks. The engaging operation is effected during the dwell at the beginning of a registering cycle of operation, and during the dwell before the return stroke of the actuator racks the accumulator gears are disengaged so that said racks will be returned idly.

Means operable to adjust accumulator 13 for additive or subtractive operation comprises a plus cam wheel 116a and a minus cam wheel 116b in the form of a spool 116 splined on a shaft 117 which extends transversely of the machine and has suitable bearings in the machine side frames. Each of the cam wheels 116a and 116b has three lobes equidistantly spaced at 120 degrees. The cam wheels are displaced 60 degrees from each other so that their lobes are equidistantly spaced at 60 degrees. Cams 116a and 116b are adapted for operation in connection with an arm 118 which is fast on shaft 70 to which the linkage 68, 69 which supports shaft 65 of the accumulator is connected.

Normally spool 116 is adjusted to ineffectively position cam wheels 116a, 116b at opposite sides of arms 118. The adjusting means comprises a slide 120 extending transversely of the machine at the rear of spool 116 and which has a forwardly extending pair of fingers 120a engaging the opposite sides of said spool. A bracket 121 (Figs. 1 and 3) extending transversely between the machine side frames has a plurality of forwardly extending ears on which slide 120 has slot and pin mounting. Slide 120 is normally held in centralized position and is adjusted toward the left to move cam 116a to effective position with respect to arm 118 for additive registration, and is adjusted toward the right to move cam 116b to effective position for subtractive registration by means hereinafter described.

Upon each registering cycle of operation, means is provided to impart four clockwise steps of movement (Fig. 13) counterclockwise (Fig. 14) of 30 degrees each to shaft 117. The driving means for stepping shaft 117 comprises a drive arm 119 which is reciprocally operated by a cam follower comprising a bell crank 122. Bell crank 122 is engaged by a cam 123 (Fig. 5a) fast on shaft 22 of the machine drive. Arm 119 extends forwardly from bell crank 122 and has at its forward end a pair of oppositely disposed spring urged pawls 124 which engage the opposite sides of a twelve toothed ratchet wheel 125 fast on shaft 117.

Arm 119 is spring urged toward the rear of the machine thereby holding crank 122 clockwise (Fig. 5a) counterclockwise (Fig. 14) into engagement with cam 123. Cam 123 comprises a pair of oppositely disposed low dwells and a pair of oppositely disposed high dwells. Normally crank 122 is engaged by a low dwell of the cam as shown in the drawings. During the dwell of the actuator rack drive at the beginning of a cycle of registration, cam 123 will be rotated to engage a high dwell with crank 122 thereby rocking said crank and moving arm 199 toward the front of the machine. Forward movement of arm 119 will cause the lower pawl 124 to rotate shaft 117 one step of movement. Crank 122 will be engaged by the high dwell of cam 123 during the forward stroke of actuator racks 80. During the midcycle dwell of the actuator drive following the forward strokes of actuator racks 80, the oppositely disposed low dwell of cam 123 will be engaged with crank 122. This will permit crank 122 to be restored thereby restoring drive arm 119 toward the rear. This rearward movement of arm 119 will affect operation of the upper pawl 124 to rotate shaft 117 a second step of movement. A third step of movement of shaft 117 will be effected during the midcycle dwell of the actuator drive before the return stroke. This third step of movement will be effected by engagement of the oppositely disposed high dwell of cam 123 with crank 122 to move drive arm 119 toward the front of the machine. During the return stroke of actuator racks 80, crank 122 will be engaged by the oppositely disposed high dwell of cam 123. During the dwell of the actuator rack drive near the end of the cycle of operation, crank 122 will be reengaged with the first low dwell of cam 123 thereby restoring arm 119 toward the rear and rotating shaft 117 a fourth step of movement.

It will be recalled that cams 116a, 116b are normally positioned in vertical planes at the opposite sides of arm 118. If slide 120 is moved toward the left from the position shown in Fig. 13, cam wheel 116a of spool 116 will be brought into the plane of arm 118. When the parts are in normal position (Fig. 13), the effective lobe of cam 116a is three steps of movement from engagement with the nose of arm 118. Therefore, the lobe of the cam will not engage arm 118 until the midcycle dwell of the actuator drive during which time the cam will be given its second and third steps of movement. For this reason, actuator racks 80 will move idly during their forward strokes and be engaged with accumulator gears 66 during their return strokes to effect counterclockwise additive rotation of said gears. During the dwell of the actuator drive near the end of the cycle the fourth step of movement of shaft 117 will move the lobe of cam 116a from engagement with arm 118 to permit disengagement of accumulator gears 66 from racks 80. The timing of the additive single stroke operation is shown by graph line (e) of Fig. 29A.

Figure 13:
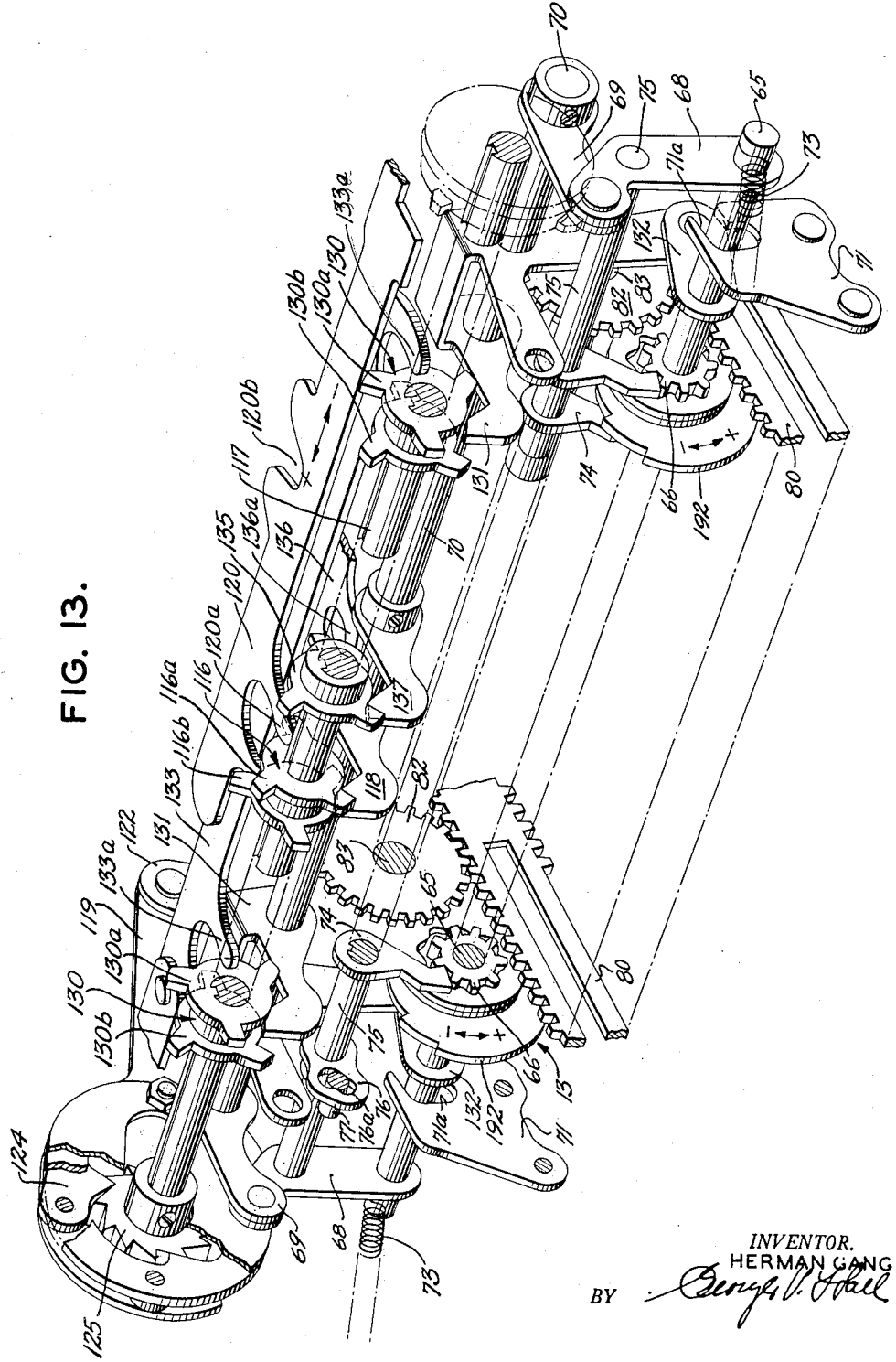
Fig. 13 is a perspective view of the sign control mechanism as associated with the accumulator and the actuator racks.
Figure 14:
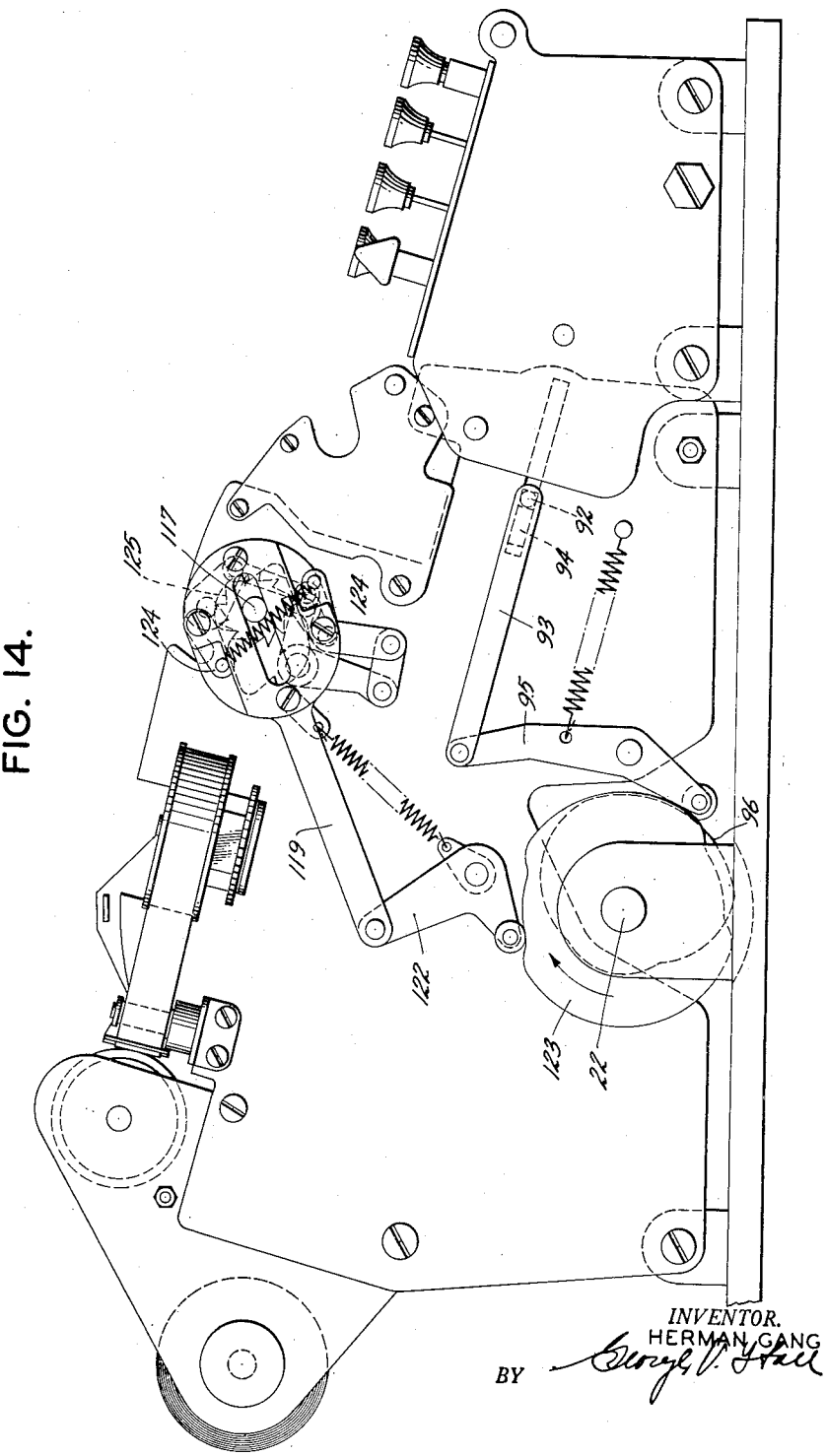
Fig. 14 is a left side elevation of the machine.
Figure 15:
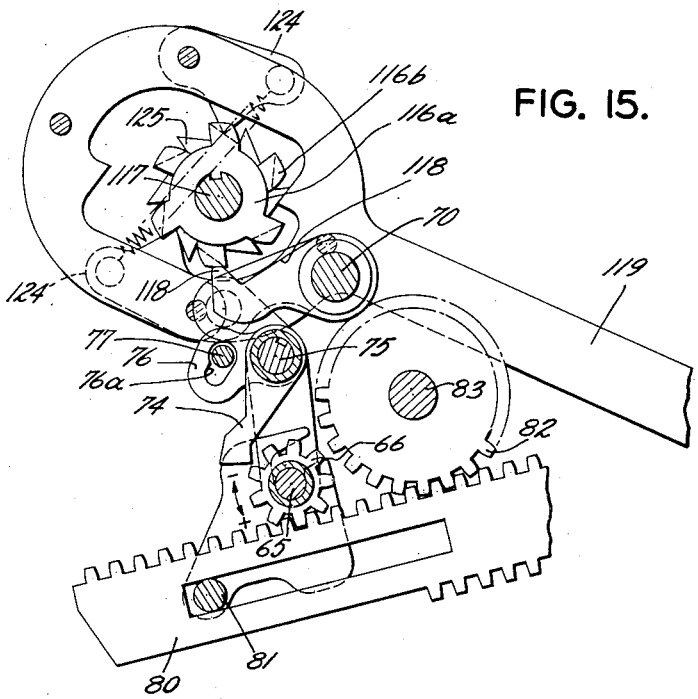
Fig. 15 is a fragmentary right side view of the controls for driving the accumulator by the actuator racks during their forward strokes.
Figure 16:
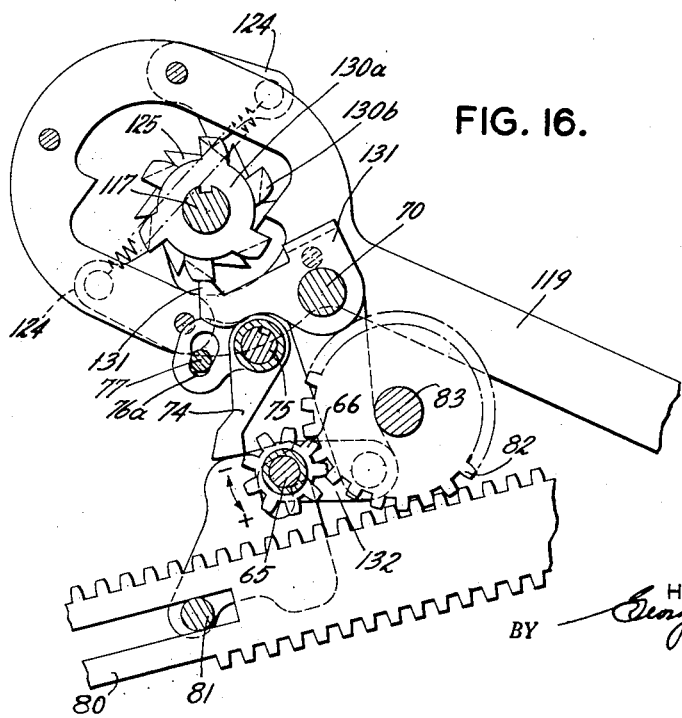
Fig. 16 is a view similar to Fig. 15 of the controls for driving the accumulator in the same direction by the actuator racks during their return strokes.
Figure 29A:
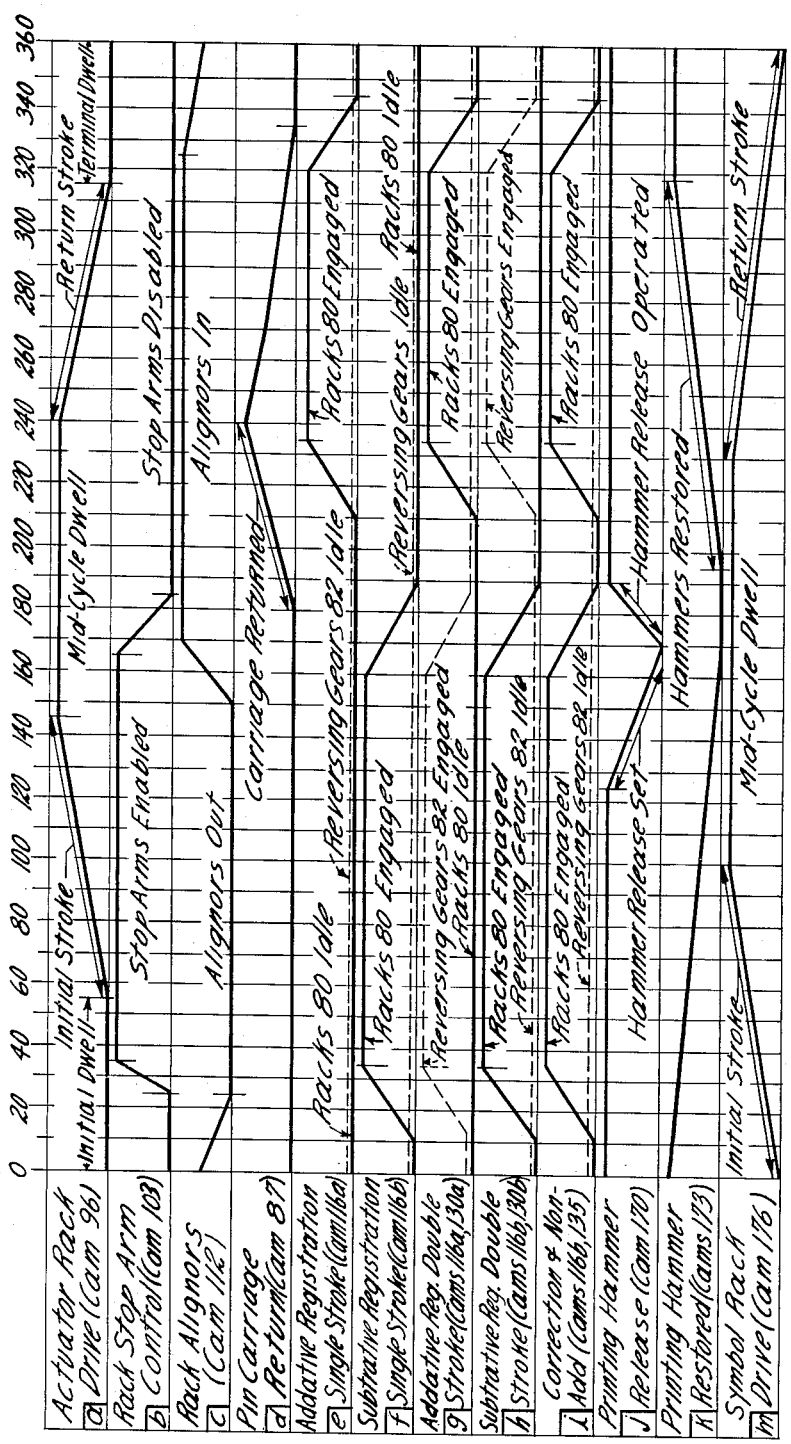
Figs. 29A and 29B are a timing chart of the various machine functions.

From an inspection of Figs. 1 and 13, it will be noted that a lobe of cam 116b is positioned counterclockwise in a plane immediately adjacent the rear of a nose at the forward end of arm 118. Slide 120 is adjusted a step toward the right, as hereinafter described, for subtractive registration. When slide 120 is adjusted to the right, cam wheel 116b will be moved into the vertical plane of arm 118; and upon one step of movement of shaft 117 clockwise, the adjacent lobe of cam 116b will engage the nose of arm 118 as shown in Fig. 15 thereby rocking said arm and shaft 70 counterclockwise. Counterclockwise movement of shaft 70 will likewise rock arms 69 fast thereon and lower links 68 on which shaft 65 of the units of accumulator 13 is mounted. As a result, accumulator 13 will be lowered and gears 66 will be engaged with the associated actuator racks 80. The subsequent forward strokes of racks 80, under control of pin carriage 2, will rotate accumulator gears 66 in clockwise subtractive direction. During the next step of movement of shaft 117 which occurs during the midcycle dwell of the actuator drive, the lobe of cam 116b will be removed from engagement with the nose of arm 118 thereby permitting accumulator gears 66 to be restored upwardly from engagement with racks 80 by springs 73. The actuator racks will therefore move idly on their rearward return stroke. Again during the midcycle dwell and before the return stroke of the racks, shaft 117 will be rotated the third step of movement. Finally after the return of the racks before the end of the cycle the fourth step of movement will be effected as heretofore described. The two steps of movement following disengagement of the lobe of cam 116b with arm 118 will bring the next lobe of said cam into the adjacent position with respect to arm 118 as shown in Fig. 1 so that the parts are in position to repeat the subtractive operation. The graph line (f) of Fig. 29A shows the timing of the subtractive single stroke operation. The control of slide 120 to adjust cam wheels 116a, 116b for additive or subtractive registration is hereinafter described in connection with various of the machine operations.

*Control of the actuators to effect additive or subtractive registration (double stroke)*

Actuator racks 80 are operable to effect a complete additive or subtractive digital registration during both their forward and return strokes. To effect the double stroke operation, cam wheels 116a, 116b are operable to control operation of actuator racks 80 during one of their strokes respectively as described, and two pairs of cam wheels are complementally operable to control operation of said racks during their respective opposed strokes. Each pair of cam wheels in the form of a spool 130 comprises an add cam 130a and a subtract cam 130b. The two pairs of cams 130a, 130b are positioned adjacent the respective ends of shaft 117 so that both ends of shaft 65 on which the units of the accumulator 13 are mounted may be simultaneously adjusted.

Cams 130a, 130b are normally positioned at either side of a nose at the end of a forwardly extending arm of a bell crank 131 (Fig. 13) which is pivotally mounted on shaft 70. The lower end of each bell crank 131 has connection with the rear of a forwardly extending link 132 which at its forward end has pivotal connection with accumulator shaft 65. It will be noted that plus cams 130a have the same angular position on shaft 117 as minus cam 116b whereas minus cams 130b have the same angular position on shaft 117 as plus cam 116a. To the rear of cams 130a, 130b is a slide 133 which is supported by slot and pin mounting on the ears of bracket 121 on which slide 120 also is mounted. A pair of spaced fingers 133a extend forwardly of slide 133 and engage the opposite sides of each spool 130.

Figure 17A:
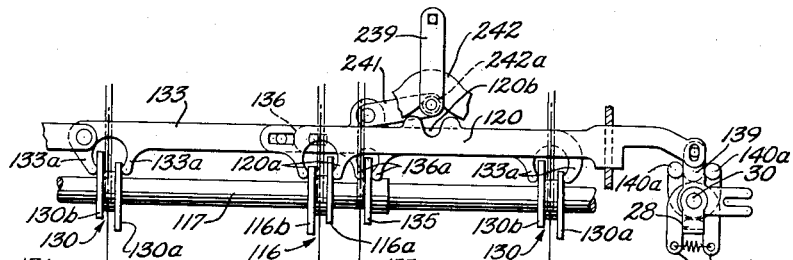
Figs. 17a, 17b, 17c, 17d and 17e are plan views of the sign control slides in their various adjusted positions to control registration in the various machine operations.

To effect double stroke additive registration slides 120 and 133 are adjusted together toward the left from the positions shown in Figs. 13, 12 and 17a to move the plus cams 116a and 130a respectively into the vertical plane of arm 118 and the forwardly extending arms of cranks 131. During the first step of movement of shaft 117 as an incident to a cycle of registration, a lobe of each cam 130a will engage and rock the associated crank 131 counterclockwise. Counterclockwise movement of crank 131 will move links 132 toward the rear. This will swing accumulator shaft 65 toward the rear as the supporting links 68 are rocked counterclockwise about their pivotal connections with arms 69 which are fast on shaft 70. The rearward movement of shaft 65 will engage accumulator gears 66 with the associated reversing gears 82. Therefore, as racks 80 are moved forwardly, accumulator gears 66 will be rotated in additive counterclockwise direction. During the midcycle dwell of the actuator drive the second step of movement of shaft 117 will remove the lobes of cams 130a from engagement with cranks 131, and during the second step of movement a lobe of plus cam 116a will engage arm 118. These respective operations of cams 130a and 116a will disengage accumulator gears 66 from reversing gears 82 and engage said gears 66 directly with actuator racks 80. Thus, during the return movement of racks 80 gears 66 will be rotated in a second additive operation. As the cycle of operation is completed, the fourth step of rotation of shaft 117 will move the lobe of cam 116a from engagement with arm 118 to disengage the actuator drive. The timing of the additive double stroke operation is shown by graph line (g), Fig. 29A.

Upon adjustment of slides 120 and 133 toward the right, minus cam 116b will be moved into the plane of arm 118 and minus cams 130b will be moved into planes of cranks 131 respectively. From an inspection of the drawings, it will be seen that with this adjustment of the control cams accumulator gears 66 will be engaged with racks 80 during their forward excursions to effect a subtractive registering operation, and during the return strokes of the racks gears 66 will be engaged with reversing gears 82 to effect a second subtractive registering operation. The timing of this operation is shown by graph line (h), Fig. 29A.

Means for adjusting slides 120 and 133 together to effect doublt stroke operation is described hereinafter in connection with certain of the machine operations. The operations, however, disclosed in the present application do not utilize the double stroke additive operation and reference is made to applicant's copending applications for a disclosure of such operation.

Another wheel cam 135 splined on shaft 117 is complementally operable in conjunction with minus cam 116b as hereinafter described. The lobes of this cam have the same angular positions as those of plus cam 116a. Cam 135 is adjusted by fingers 136a of a slide 136 which is mounted on the bracket 121, on which slides 120 and 133 are mounted, by pin and slot mounting. Normally slide 136 is spring held toward the right as hereinafter described to the limit of its slot and pin mounting. Normally cam 135 is positioned to the right (Fig. 13) of an arm 137 fast on shaft 70 and which is similar to arm 118. By control means hereinafter described slide 136 is adjusted toward the left to bring cam 135 into the plane of arm 137 and simultaneously slide 120 is adjusted toward the right to bring minus cam 116b into the vertical plane of arm 118. With control cams 116b and 135 adjusted to effective position, accumulator gears 66 will be adjusted and held into engagement with actuator racks 80 during both their forward and return strokes of a cycle of operation. A value set in pin carriage 2 will therefore be subtracted from the accumulator during the first half of a registering cycle and added during the second half of the cycle. This noneffective operation of the registering mechanism is used in connection with a non-add or alternatively a correction cycle as hereinafter described. The timing of this operation is shown by graph (i), Fig. 29A.

*Additive and subtraction*

Addition and subtraction is effected by single stroke operation of the registering mechanism. Slide 120 for plus and minus cams 116a, 116b extends outwardly through the right side frame and at its right end (Figs. 3, 12, 17a–17e) has pin and slot connection with the rearwardly extending arm of a bell crank 139. Crank 139 is pivotally mounted on shaft 30 adjacent the top end of clutch control yoke 28 which as heretofore described is pivotally mounted on said shaft. A pair of scissors 140 are pivotally mounted on shaft 30 below crank 139. A pair of the opposed arms of scissors 140 extend forward at the opposite sides of yoke 28 and are spring urged into engagement therewith. The scissor arms 140 extend toward the rear and cross over so that a stud 140a at the end of each arm engages the opposite sides of the rearwardly extending arm of crank 139. The scissors 140 are, therefore, yieldably operable to maintain crank 139 in a normal position with respect to yoke 28. It will be recalled that yoke 28 is centralized by scissors 32 to disengage main clutch 18. When yoke 28 is centralized and crank 139 is held in normal position with respect to said yoke by scissors 140, slide 120 will be in normal centralized position in which cams 116a, 116b are ineffectively positioned at opposite sides of arm 118. The above adjusted positions of the parts is schematically shown in Fig. 17a wherein the dot dash line 118a indicates the plane of arm 118.

Extending toward the left from the bottom of yoke 28 is an arm 28b (Fig. 12) which at its end is connected to a forwardly extending link 142. At its forward end, link 142 is connected to an upstanding arm of a crank 143 (Fig. 6). The rear end of a plus minus slide 144 is pivotally connected to the upstanding arm of crank 143 adjacent link 142, and at its forward end said slide has pivotal mounting at the top of an arm 145 which is pivotally mounted at its lower end on a cross shaft 146. Plus minus slide 144 has a plurality of cam slots in its upper edge. A shoulder of the stem of add key 3 overlies one of these slots and the shoulder of a stem subtract key 4 overlies another of said slots.

Figure 17B:
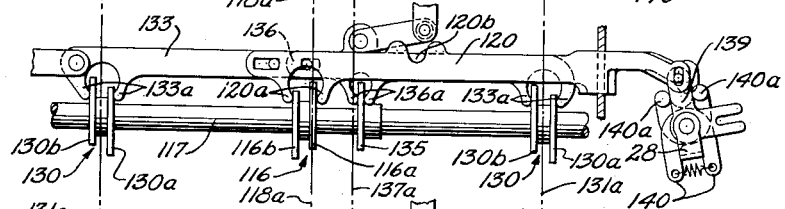

Upon depression of add key 3 (Figs. 2 and 3), the shoulder of its stem will cam slide 144 toward the front of the machine from the position shown in Fig. 6 thereby rocking yoke 28 counterclockwise from the position shown in Fig. 12 through the connecting linkage. Counterclockwise movement of yoke 28 will remove arm 28a from engagement with arm 27b of clutch lever 27 thereby effecting engagement of main clutch 18. Furthermore, upon counterclockwise movement of yoke 28, slide 120 will be adjusted toward the left to position cam wheel 116a for effective operation. This position of the part is shown in Fig. 17b. An additive cycle of the registering mechanism will therefore be effected. During the cycle of operation, yoke 28 will be held in rocked position by engagement of arm 27b of the clutch lever with the side of arm 28a of the yoke. At the end of the cycle, crank 27 will be rocked to clutch disengaging position thereby permitting yoke 28, slide 120, cam 116a, and plus minus slide 144 to be restored.

Figure 17C:
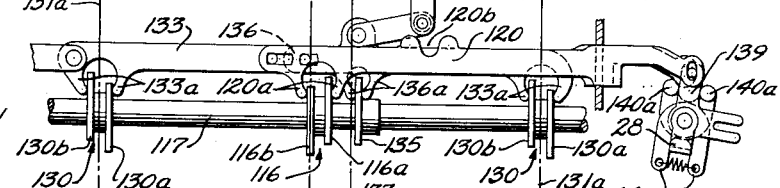

Upon depression of subtract key 4 the shoulder of its stem will cam slide 144 toward the rear of the machine. This will reversely rock yoke 28, i.e., clockwise (Fig. 12). Slide 120 therefore will be moved toward the right to adjust minus cam 116b to effective position. This position of the parts is illustrated in Fig. 17c. A subtractive cycle of operation of the registering mechanism will therefore be effected and at the end of the cycle the parts will be restored to normal as described in connection with the additive operation.

Repeat key

Repeat key 11 (Figs. 2, 3, 10 and 11) is integral with a slide 250 which lies atop of a second slide 251. A fixed pin 248 extends upwardly through a pair of longitudinally aligned slots at the front of slides 250—251, and a fixed pin 249 extends upwardly through a pair of longitudinally aligned slots at their rear. A pin 251a in the upper face of slide 251 extends upwardly through the front slot 250a of slide 250. A spring between fixed pin 249 and pin 251a normally holds slide 251 rearwardly to the limit imposed by the engagement of the front end of its rear slot with pin 249. With slide 251 in its rear position, pin 251a normally engages the rear end of the front slot 250a of slide 250 and thereby holds slide 250 rearwardly to engage a pin 250c at its rear with a cam edge at the right end of a slide 252.

Repeat key 11 is manually adjusted toward the front of the machine to enable the repeat means. Upon forward movement of key 11 slides 250, 251 will be moved in like direction against the tension of their spring. Extending toward the right from slide 250 is an arm 250b which normally abuts the left end of a latch slide 253 which is spring urged toward the left. Upon forward movement of slide 250 slide 253 will be spring moved toward the left to the rear of arm 250b thereby locking slide 250 in forward adjusted position.

An arm 250c extends downwardly from slide 250 and has at its lower end a pin 254 which underlies a cam edge of a rearwardly extending arm of a crank 255. Pin 254 will therefore rock crank 255 counterclockwise from the position shown in Fig. 11 upon forward movement of slide 250. The other arm of crank 255 extends downwardly and terminates in a forked end which engages a pin at the end of an arm 256 which is fixed on shaft 115. Counterclockwise movement of crank 255 will rock arm 256, shaft 115 and arm 114 clockwise. Clockwise movement of arm 114 will raise link 113 thereby lifting the forward end of arm 104 and hooked end 104a. Therefore, when arm 104 is moved toward the rear in a carriage return operation as an incident to each machine cycle, hooked end 104a will move ineffectively above pin 39a of segment 39 so that carriage 2 will remain in its left shifted position. Consequently, add key 3 or subtract key 4 may be held depressed for plural cycle operation of the machine during which time pin carriage 2 will remain in shifted position to control repeated operation of the registering mechanism.

Means is provided to restore repeat key 11 upon depression of any one of the other operation keys 5—8. Such means comprises a crank 257 (Fig. 3) to one arm of which is connected the right end of latch slide 253. The other arm of crank 257 extends toward the right for operation in connection with a release slide 258 which is cammed toward the front of the machine upon depression of any one of said keys 5—8. Upon forward movement of slide 258, a lug thereof will rock crank 257 clockwise thereby moving latch slide toward the right from engagement with arm 250b of slide 250. Upon release of slide 250 said slide and slide 251 will be moved by the spring attached to pin 251a toward the rear to normal position. Movement of slide 250 to normal will release crank 255 thereby permitting arm 104 and hooked end 104a to be restored downwardly to effective carriage return position.

Non-add and correction

Adjusting slide 136 (Figs. 8 and 12) for wheel cam 135 has pin and slot connection at its right end with a rearwardly extending arm 150a of a yoke 150 which is pivotally mounted on shaft 30 between the arms of yoke 28. Extending toward the left from yoke 150 is an arm 150b at the end of which is connected a forwardly extending link 151 which at its forward end is connected to an upstanding arm of a crank 147. The rear end of a slide 152 which is mounted adjacent the left side (Fig. 3) of plus/minus slide 144, in like manner, is pivotally connected to the upstanding arm of crank 147 adjacent the connection of link 151. Slide 152 has a plurality of cam slots in its upper edge, and overlying one of these cam slots and one of the cam slots of plus/minus slide 144 is a shoulder of the stem of correction key 5.

Figure 17D:
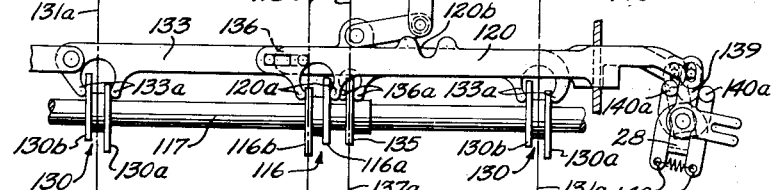

Upon depression of correction key 5 (Figs. 2 and 3), slide 144 will be moved toward the rear and slide 152 will be moved toward the front of the machine. Rearward movement of slide 144 will adjust minus cam 116b to effective position as described in connection with depression of subtract key 4 and forward movement of slide 152 will rock yoke 150 counterclockwise (Fig. 12) to move slide 136 toward the left thereby effectively positioning cam 135. This adjustment of the parts is shown in Fig. 17d in which the dot-dash line 137a indicates the vertical plane of arm 137. With cams 116b and 135 adjusted to effective position, the registering mechanism will operate subtractively during the forward stroke and additively during the return stroke. Therefore, during this operation no effective registration will be made in the accumulator and pin carriage 2 will be restored to restore pins 50. Furthermore, during this operation the printing mechanism hereinafter described will be disabled.

Upon depression of non-add key 8 (Figs. 2 and 3), slides 144 and 152 will be adjusted corresponding to the adjustment upon depression of correction key 5. However, as distinguished from the correction operation, the printing mechanism will be operated so that the digital value entered in pin carriage 2 will be printed although such amount is not registered in the accumulator.

Printing mechanism (general description)

The printing mechanism is contained between a pair of spaced plates 154 (Figs. 1, 3, 18, 19) which are supported intermediate the machine side frames by a pair of square shafts 155, 156.

Each ordinal printing unit comprises the type wheel 16 having peripherally spaced 0 to 9 type and driven by a downwardly extending train comprising a pinion 157 fast on its right side, an intermediate gear 158 meshing with pinion 157, and an intermediate gear 159 meshing with gear 158 and with auxiliary rack 85b of the ordinally corresponding actuator rack 85. Type wheel 16 and its drive train are mounted on a hammer comprising a plate 160 which is pivotally mounted at its lower end adjacent the mesh point of gear 159 and rack 85b on a bridging strip 161 which is secured at its ends to shafts 155, 156. Hammer 160 is biased clockwise by a spring 162 attached to the end of a rearwardly extending arm 160a thereof.

Normally, hammer 160 is held counterclockwise (Figs. 1 and 18) against the tension of its spring by a latch 163. Latch 163 comprises an arm pivotally mounted on a shaft 165 which is supported by plates 154 at the front of hammers 160 and which is common to all of the latches. Latch 163 extends to the rear and is provided with a hook end which is adapted for engagement with a shoulder at the upper edge of hammer 160 thereby holding said hammer counterclockwise. Latch 163, intermediate its ends, has a depending arm which is pivotally connected to the upper end of a downwardly extending operating link 164, the lower free end of which normally engages the forward end of the associated rack 85b. Intermediate its ends, link 164 is spring biased in a rearward and downward direction. Link 164 is therefore urged counterclockwise to engage its lower free end with the end of rack 85b. Furthermore, the downward urge of link 164 biases latch 163 clockwise to latching engagement with hammer 160.

A bail 166 is operable to trip latches 163 to release hammers 160 for clockwise movement in a printing operation as hereinafter described. Bail 166 has a front edge comprising a series of guide slots engaged by the respective operating links 164. Normally, each link 164 is held clockwise by the engaged rack 85b so that its rear edge is positioned slightly forward of the rear end of its guide slot in bail 166 and with an undercut shoulder 164a in said rear edge slightly below said rear end of the slot. At its ends, bail 166 is supported by a pair of arms which extend toward the rear and have pivotal mounting on shaft 155. Pivotally attached at its upper end to the left arm of bail 166 is a downwardly extending link 167 (Figs. 1, 5b and 18) which at its lower end is connected to a cam follower 168. Cam follower 168 comprises a horizontally disposed spring biased crank arm mounted at its rear on a cross shaft 169 and having a roller at its forward end engaging a cam 170 fast on main operating shaft 22. Normally follower 168 engages the high portion of cam 170 thereby holding link 167 raised and bail 166 clockwise.

A bail 174 (Figs. 1, 18 and 19) is operable to restore hammers 160 after a printing operation. Bail 174 normally engages the undersides of arms 160a (Fig. 1) of hammers 160 and is supported at its ends by a pair of forwardly extending arms 174a which at their forward ends have pivotal mounting in axial alignment with said hammers. Intermediate the ends of each arm 174a, the upper end of a cam follower comprising downwardly extending push arms 172 are pivotally connected. Adjacent its lower end each push arm 172 is provided with a guide slot through which shaft 169 passes, and at the end of each arm is a roller engaging a like cam 173 fast on main drive shaft 22. Normally followers 172 are engaged by the high dwells of their respective cams 173 to hold bail 174 in the counterclockwise lifted position shown in Fig. 1.

*Printing mechanism (operation)*

Latch release bail 166 is normally latched against counterclockwise movement by a lug 177a (Figs. 18 and 19) at the end of an arm of a latch comprising a bifurcated member 177. The printing mechanism is therefore normally disabled. Latch 177 is controlled, as hereinafter described, by mechanism which is operable to print a symbol indicating the character of the machine operation. When latch 177 is released, the printing mechanism is operable during a machine cycle as follows.

During the first half of the machine cycle, actuator racks 80 and 85 will be operated under control of pin carriage 2. Type racks 85b therefore will be moved toward the rear distances in accordance with the movements of racks 80 to effect registration in type wheels 16 corresponding to the registrations in the respective units of accumulator 13. Upon rearward movement of a type rack 85b to register a digit 1 to 9, the associated link 164 will be released and spring moved counterclockwise to engage its rear edge above shoulder 164a with the rear end of its guide slot in bail 166. During the above movement of the actuator racks, cam follower 168 will dwell on the high portion of cam 170. However, during the midcycle dwell of the actuator rack drive, the cam follower will be engaged by the low portion and then reengaged by the high portion of cam 170. The timing of this operation is shown by the graph line (j) Fig. 29A. This operation will rock latch release bail counterclockwise and return. Furthermore, during the first half cycle and before return movement of latch release bail 166, cam followers 172 will be moved from the high to the low dwells of cams 173. This will lower followers 172 there- by rocking bail 174 clockwise so that hammers 160 will be permitted clockwise printing movement if released by latches 163.

Upon counterclockwise movement of bail 166, the ends of the guide slots therein for links 164 will be moved below the respective shoulders 164a. Therefore, links 164, which have been released by tape racks 85b and rocked counterclockwise to engage the ends of the respective guide slots of bail 166, will be rocked further counterclockwise to move their shoulders 164a to the rear of and above the ends of said guide slots. With this adjustment of links 164 and their shoulders 164a, the return clockwise movement of bail 166 will be effective to raise said links thereby rocking the connected latches 163 counterclockwise and releasing the respective hammers 160 for clockwise printing operation by their springs 162. However, in the orders in which there is no registering operation of type racks 85b, shoulders 164a of the associated links 164 will be held in their normal positions (Figs. 1 and 18) forwardly of the ends of their slots in bail 166 and said bail will therefore be ineffective to release latches 163 of those orders.

Well-known means is provided to print zeros in all orders to the right of any order in which a latch 163 is released. Such means comprises a finger 163a at the upper edge of each successive lower order latch 163 which overlies the next higher order latch. Therefore, if any latch is released all lower order latches which are not released by bail 166 also will be released.

After the printing operation and during the second half of the machine cycle, the high portions of cams 173 will be reengaged with followers 172. This will restore bail 170 counterclockwise thereby restoring hammer 160 to latched position. The timing of this operation is shown by graph line (k) Fig. 29A.

*Printing mechanism (symbol printing)*

A symbol wheel 16a (Fig. 3) having appropriate type to indicate the character of the machine operation is located to the right of numeral type wheels 16. Symbol wheel 16a has mounting means similar to type wheels 16, is of like construction and is driven through a like gear train from a symbol rack 175a (Figs. 5b, 18 and 19) which extends upwardly from a slide 175. Slide 175 has common mounting with actuator racks 85 for longitudinal movement on cross shafts 86 and is spring urged toward the rear of the machine. Normally slide 175 and rack 175a are held toward the front of the machine by the high portion of a cam 176 on shaft 22 engaging a yieldably mounted follower 178 in the form of a pivotally mounted arm spring biased counterclockwise with respect to said slide.

Figure 18:
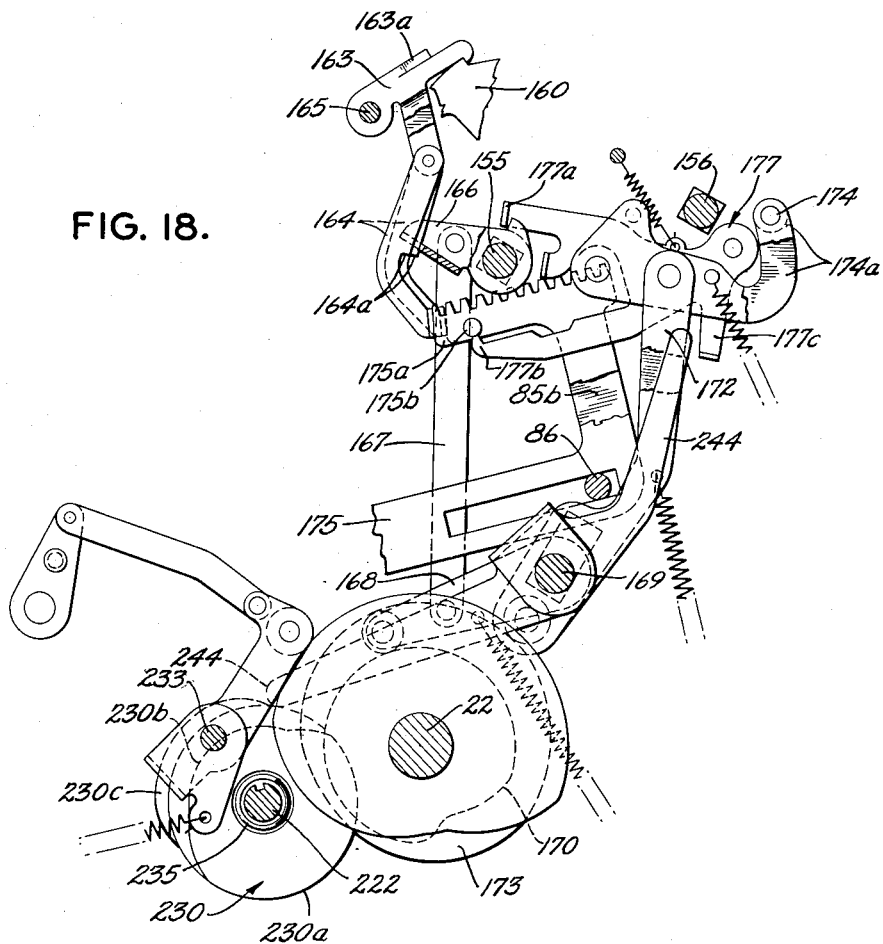
Fig. 18 is a fragmentary right side view of the printing control mechanism.
Figure 19:
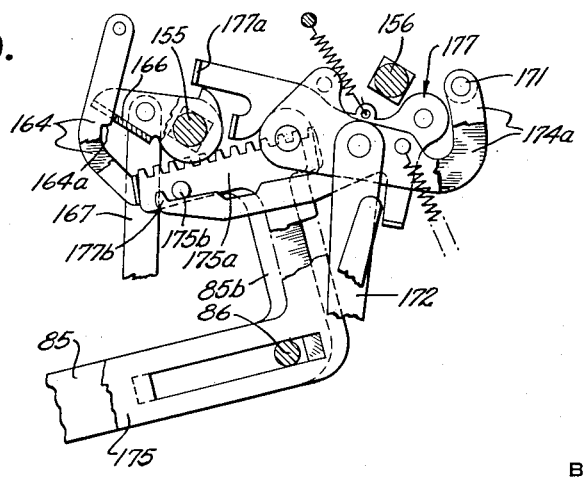
Fig. 19 is a fragmentary right side view of parts shown in Fig. 18 in an operated position.

Symbol rack 175a is similar to type racks 85b and controls a link 164 in like manner for operation by bail 166 to release a latch 163 for a hammer 160 on which symbol wheel 16a and its gear train are mounted. Rack 175a, however, distinguishes from racks 85b by its forward end which normally is located forwardly of the fronts of said racks 85b as shown in Fig. 18. By this arrangement, symbol rack 175a may be given a step of movement toward the rear, as hereinafter described, without permitting sufficient counterclockwise movement of its link 164 for operation by bail 166. For this reason, after a single step of movement, the printing mechanism for symbol wheel 16a will remain disabled. However, the single step of movement of rack 175a will release bail 166 from the restraint of latch 177, and the printing mechanism for type wheels 16 will be enabled for operation in response to rearward movement of racks 85b as described. Upon more than one step of movement of rack 175a, its link 164 will be rocked sufficiently for operation by bail 166 and the printing mechanism for both type wheels 16 and symbol wheel 16a will be enabled.

Latch 177, which is spring biased clockwise, is normally held counterclockwise (Fig. 18) by a pin 175b on symbol rack 175a engaging a nose 177b at the forward end of the lower arm of said latch. Lug 177a of the upper arm of the latch will therefore be held downwardly in engagement with a shoulder at the upper side of the right arm of bail 166 to hold said bail against counterclockwise operating movement. Thus, the printing mechanism is normally disabled. However, upon one or more steps of rearward movement (Fig. 19) of rack 175a, pin 175b will be removed from engagement with nose 177b and latch 177 will be rocked clockwise thereby raising lug 177a to release bail 166.

During the first half of a machine cycle and before rocking of bail 166 in the printing operation, cam 176 (Figs. 5b and 28) will be rotated counterclockwise to move its high portion from engagement with follower 178 thereby permitting rearward movement of symbol slide 175 and rack 175a. However, the extent of this movement is controlled by the stem of the particular depressed operating key in blocking position with respect to a symbol plate 179 (Figs. 8 and 9) which is mounted for sliding movement transversely of the machine by slot and pin mounting at the lower ends of a pair of posts 181 which extend downwardly from a guide plate 180 fixed below the keyboard for the ends of the various operation keys and the numeral keys 1.

Figure 9:
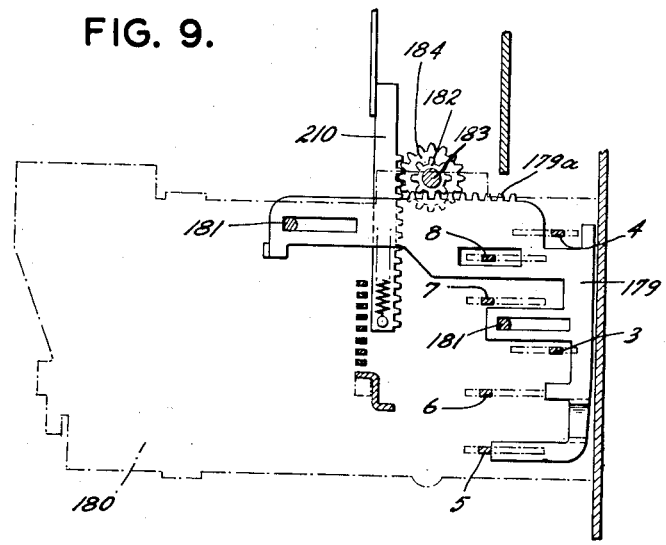
Fig. 9 is a fragmentary plan view of the symbol mechanism.

Symbol plate 179 has at its rear edge a rack 179a which is engaged with a gear 182 fast on a vertically mounted shaft 183. Shaft 183 extends downwardly and has a gear 184 fast adjacent its lower end. Gear 184 is engaged with a rack arm 210 which extends toward the rear and at its rear end has pivotal connections with the front end of symbol slide 175. With slide 175 and rack arm 210 held in normal forward position against the tension of their spring, gears 182, 183 will be in counterclockwise position to adjust symbol plate 179 to its rightmost position as shown in Fig. 9.

Symbol plate 179 is stepped and slotted to provide a series contact stop edges located normally at predetermined distances to the right of the respective ends of the various operation keys 3—8. When keys 3—8 are in raised position, the ends of their stems are above the plane of plate 179. However, upon depression of one of the keys, the end of its stem will be lowered below the plane of plate 179. Upon operation of the machine and movement of the high portion of cam 176 from engagement with follower 178, symbol slide 175 will be released for movement toward the rear, and this movement through the connecting gear train will move plate 179 toward the left until arrested from such movement by engagement with the stem of the depressed key. The extent of the rearward movement of symbol rack 175a will therefore be controlled by plate 179 to adjust symbol wheel 16a for the printing operation.

A correction cycle of the machine operates only to restore and clear pin carriage 2 and therefore the printing mechanism is disabled during this operation. To provide for this, depression of correction key 5 will locate its stem to a position immediately adjacent its stop edge of plate 179. Therefore upon operation of the machine, plate 179 and the connected parts will be blocked from movement and latch 177 will not be released to enable the printing mechanism.

It is the usual practice to omit a symbol in additive operation of listing machines. To this end, the stem of add key 3 is adapted to permit one step of movement of plate 179 and the entrained parts. It will be recalled that symbol rack 175a is extended forwardly a greater distance (Fig. 18) than are numeral wheel racks 85b. For this reason, the one step of rearward movement of rack 175a will not permit sufficient counterclockwise movement of the engaged link 164 to bring said link into operative engagement with bail 166. The one step of movement, however, will release latch 177 to enable the printing mechanism. The other operation keys will permit predetermined degrees of movement of symbol plate 179 to enable the printing mechanism for both numeral wheels 16 and symbol wheel 16a and to adjust wheel 16a to bring the appropriate symbol to printing line position.

Figure 29B:
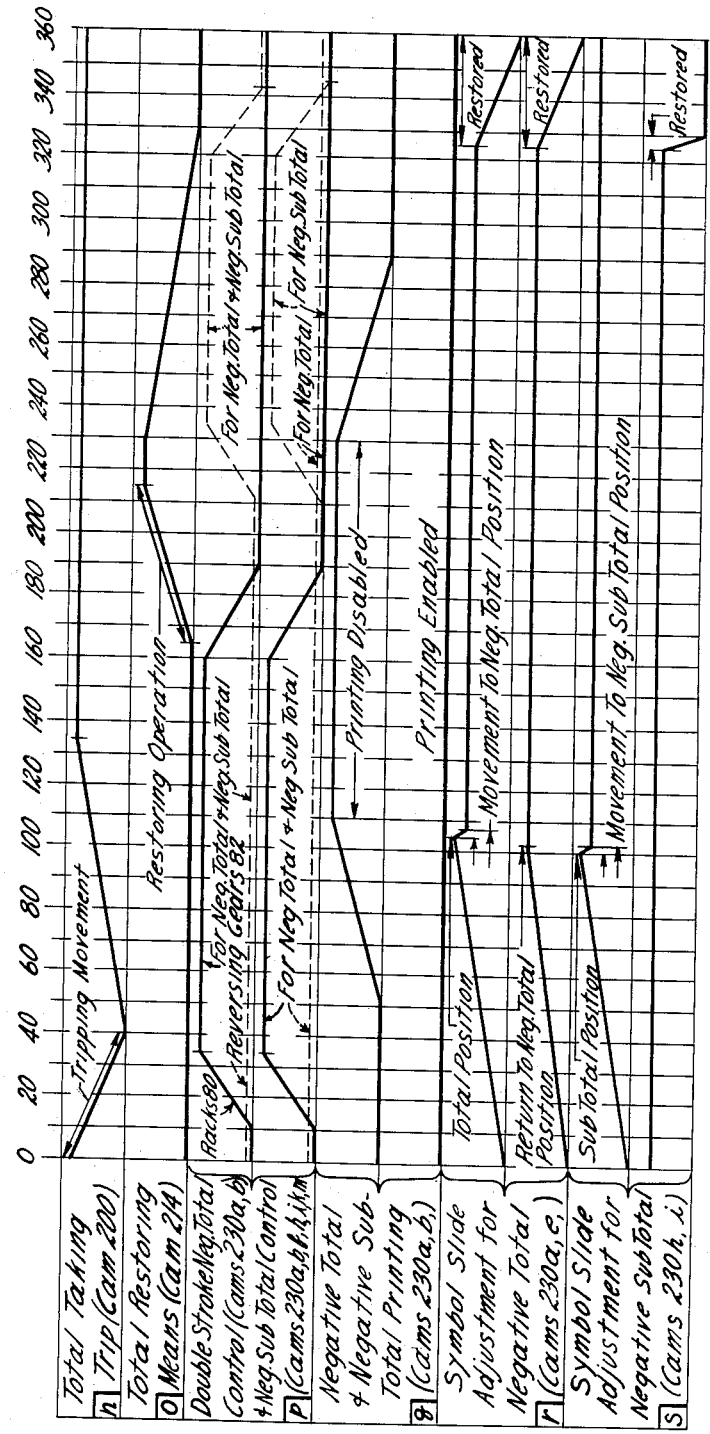

After a printing operation and during the second half of the machine cycle, the high portion of cam 176 will be reengaged with yieldable follower 178 to restore symbol slide 175 and the connected parts. In this operation, follower 178 will not yield but will remain in fixed relation with respect to slide 175. As will be described hereinafter, follower 178 is adapted to yield in connection with certain negative total and subtotal operations in which adjustment of symbol slide 175 is involved. The timing of the release and the restoring of symbol slide in the aforedescribed operations is shown by graph line (m) Fig. 29B.

*Total and subtotal*

In a total taking operation the wheels of the crawl carry accumulator 13 (Figs. 1 and 4) are rotated to zero position successively from right to left by subtractive operation of actuator racks 80. This sequential operation removes the partial tens transfer from the successive higher order accumulator wheels so that in the zeroizing operations the associated type wheels 16 will be moved to position the full figure registration for the printing operation. This operation proceeds from right to left as rapidly as the accumulator wheels are moved to zero, broadly in accordance with the principles disclosed in Patent #2,261,341. However, the controls of the present disclosure include a fewer number of parts and are particularly adapted for operation in the machine of said disclosure. Furthermore, the controls are particularly adapted for operation in conjunction with the novel negative total and subtotal mechanisms of the invention.

Figure 22:
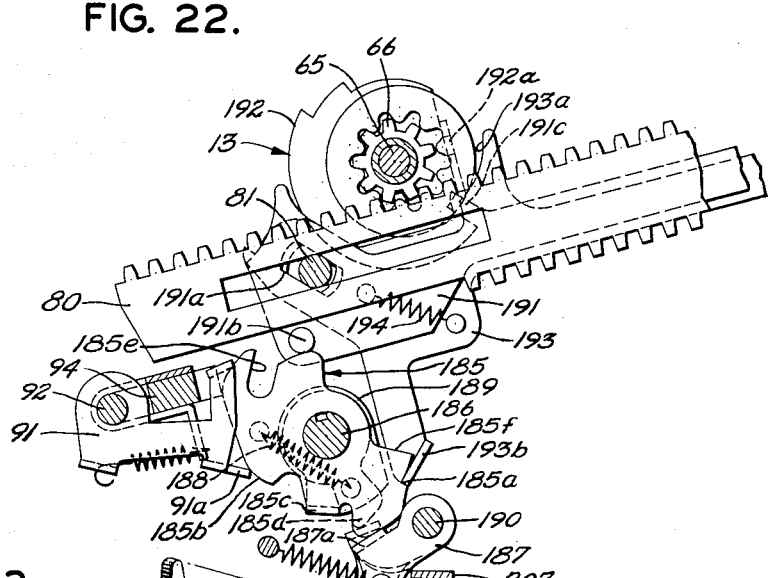
Fig. 22 is a fragmentary right side view of the total taking mechanism in another operated position.
Figure 23:
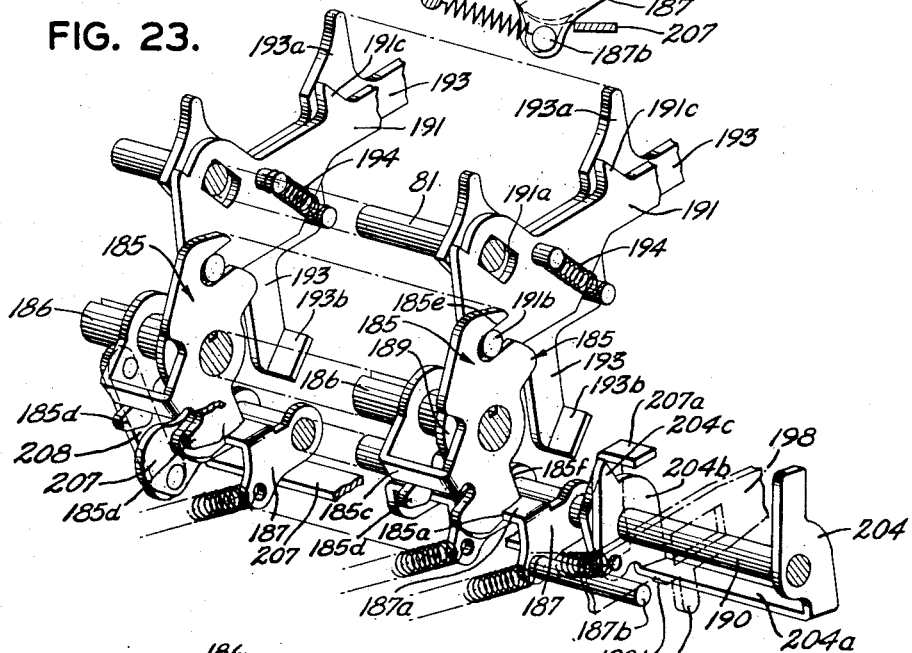
Fig. 23 is a fragmentary perspective of the total taking mechanism.

The total taking controls include means for successively releasing latches 91 (Figs. 1, 20, 21, 22 and 23) from right to left which normally restrain actuator racks 80 in their rearward positions. The means for releasing each latch 91 comprises a cam plate 185. Cam plates 185 are rotatably mounted on a rock shaft 186 which extends transversely of the machine below racks 80 and to the rear of latches 91. Each plate 185 is normally held in clockwise position (Figs. 1, 20 and 23) by a latch 187 against the tension of a spring 188. Spring 188 is attached at one end to the left face of cam 185, and at the other end it is attached to an arm 189 which is keyed on rock shaft 186. Latch 187 comprises a pair of forwardly extending arms pivotally mounted on a shaft 190 and connected by a cross strip 187a. Latch 187 is spring biased clockwise and the forward edge of cross strip 187a normally engages a shoulder 185a of cam plate 185 thereby normally holding said plate clockwise against the tension of spring 188. At the forward edge of cam plate 185 is a cam edge 185b which is normally located above a rearwardly extending lug 91a of the associated latch 91. Extending toward the left from plate 185 is a cross strip 185c which connects with a cam ear 185d which is normally located forwardly of latch 187 of the next higher order cam plate 185.

A total plate 191 is controlled by cam plate 185. Total plate 191 is longitudinally disposed in the direction of the associated actuator rack 80 and located adjacent its left side. Adjacent its front and rear ends plate 191 is provided with a slot 191a which is disposed at an angle and which engages the respective cross shafts 81 which support actuator racks 80. Adjacent its front end plate 191 is provided with a pin 191b which is engaged by a cam slot 185e of the associated plate 185. When plate 185 is in its normal clockwise position, cam slot 185e will locate total plate 191 in the lowered position shown in Figs. 1, 20 and 23. Upon counterclockwise movement of plate 185, plate 191 will be moved upwardly on its mountings on shafts 81 as shown in Figs. 21 and 22.

Extending upwardly from total plate 191 is a total hook 191c which is adapted for engagement by a lug 192a of a plate 192 of the associated wheel of accumulator 13. Lug 192a is adapted to engage total hook 191c upon movement of the wheel to zero position. However, when the parts are in the normal position shown in Figs. 1, 20 and 23, total hook 191c is below the path of rotation of lug 192a.

Adapted for movement with total plate 191 is a release plate 193. Plate 193 is in sliding engagement with the left face of plate 191 and has similar and aligned slots which support it in like manner on shafts 81. A spring 194 urges plate 193 upwardly with respect to plate 191 and is normally located with respect thereto by a pin on plate 193 which acts as a stop by engagement with the lower edge of plate 191. At the upper edge of release plate 193 is a cam edge 193a which is adapted for engagement by lug 192a of the associated accumulator wheel and is normally below the path of movement thereof. Extending downwardly from release plate 193 is an arm the free end of which terminates in a lug 193b. Lug 193b is located to the rear and normally in spaced relation with respect to the rear edge 185f of cam plate 185. As will be hereinafter described, lug 193b is adapted to be engaged by edge 185f and shoulder 185a thereby controlling counterclockwise rotation of cam plate 185 in the total taking operation.

Upon depression of total key 6 (Figs. 2 and 7), main clutch 18 will be engaged and the machine will be adjusted for subtractive operation. However, the operation of clutch 18 will be interrupted after a step of movement. During interrupton of the operation of clutch 18 the control mechanism will be operable to successively release latches 91, and the successive orders of accumulator 13 will be rotated to zero position by racks 80 thereby properly adjusting the respective type wheels 16. Following the zeroizing of the accumulator, clutch 18 will be reengaged to complete its cycle of operation during which time the total will be printed and the machine normalized.

To engage the machine for subtractive operation, a shoulder of the stem of total key 6 upon depression of said key engages a cam edge of add/subtract slide 144 (Figs. 3 and 7) thereby moving said slide toward the rear of the machine. This will adjust yoke 28 to subtract position and release clutch lever 27 as heretofore described to engage clutch 18. Furthermore, upon depression of total key 6 the shoulder of its key stem will engage a cam slot of a total slide 195 located to the right (Fig. 3) of slide 144 to adjust said total slide toward the rear to effective position simultaneously with the adjustment of add/subtract slide 144. This rearward movement of slide 195 will adjust devices to interrupt operation of clutch 18 and to initiate operation of the heretofore described means for successively releasing latches 91.

To effect the above operations, total slide 195 is connected at its rear with one arm of a bell crank 196 (Fig. 7). The other arm of bell crank 196 extends downwardly and terminates in a lug which normally overlies the forwardly extending arm of a second bell crank 197. The other arm of bell crank 197 has pivotal connection with the forward end of a link 198 which extends toward the rear and terminates adjacent clutch 18. The rear end of link 198 has pivotal connection with the upper arm of a cam follower comprising a lever 199 the lower arm of which engages a cam 200 on main drive shaft 22 (also Fig. 5c). Link 198 is spring biased toward the front of the machine thereby urging follower 199 counterclockwise into engagement with cam 200. Normally follower 199 engages the high portion of cam 200 and is thereby held clockwise with connected link 198 toward the rear against the tension of its spring.

Upon initial rotation of cam 200 by clutch 18, the high dwell of said cam will be moved from engagement with follower 199. Normally follower 199 will be restrained from appreciable counterclockwise movement by engagement of crank 197 with the lug of crank 196. However, upon rearward movement of total slide 195, crank 196 will be rocked clockwise thereby releasing crank 197. Near the beginning of the cycle of operation of clutch 18 the high portion of cam 200 will be moved from engagement with follower 199. Link 198 therefore will be moved toward the front of the machine to rock follower 199 counterclockwise into engagement with the low portion of said cam. Furthermore, upon clockwise movement of crank 196, a pin on the downwardly extending arm thereof will rock a shoulder of a spring latch 201 counterclockwise to a position above a lug 101a on arm 101. This will prevent stop arms 84 from being moved upwardly into active position with respect to pin carriage 2 as hereinbefore described in connection with a registering operation. Values for a subsequent operation therefore may be set in the pin carriage during the total taking operation of the machine.

Figure 24:
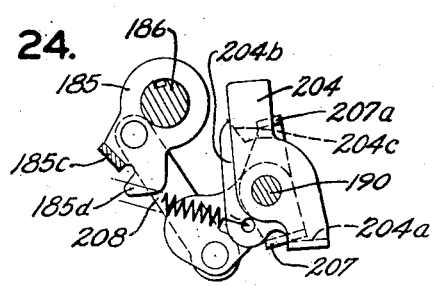
Fig. 24 is a right side detail view of parts of the total taking mechanism.

During the forward movement of link 198, the means for interrupting operation of clutch 18 is adjusted to active position. Such means comprises an upstanding finger 204 (Figs. 7, 23 and 24) which is pivotally mounted on shaft 190 which supports link 198 intermediate its ends and on which also are mounted the hereinbefore described latches 187 for cam plates 185. At its lower end, finger 204 has an extension 204a toward the left which is connected with a release member 204b including a shoulder 204c. A lug 198a extends downwardly from the under side of link 198 and engages the forward edge of extension 204a of finger 204. Finger 204 and the connected parts are spring biased clockwise and when link 198 is in its normal rearward position, finger 204 is held counterclockwise (Fig. 7) in front of a forwardly extending arm of an auxiliary clutch lever 205.

Upon forward movement of link 198, lug 198a thereof will permit clockwise movement of finger 204 by its spring into engagement with the end of the arm of clutch lever 205. Shortly after engagement of clutch 18, pin 21a mounted on the driven member thereof will engage and pass beyond a nose 205a at the end of a depending arm of clutch lever 205. This will rock clutch lever 205 clockwise to raise its forwardly extending arm above the end of finger 204. Finger 204 therefore will be permitted further clockwise movement by its spring thereby moving its end beneath the arm of lever 205 to hold it in rocked clockwise position as said lever is released by pin 21a. The clockwise movement of lever 205 will move a lug 205b of a rearwardly extending arm thereof into the path of movement of clutch pawl 20 thereby disengaging clutch 18. During this initial step of movement of clutch 18, accumulator 13 will be moved downwardly to engage wheel gears 66 with actuator racks 80 as described in connection with subtractive operation of the machine. The initial step of movement of clutch 18 does not extend beyond the range of the idle dwell of the actuator rack drive at the beginning of the cycle. Latches 91 will, therefore, at this time, remain in their normal rearward position.

In addition to the above operations attendant the forward movement of link 198, the movement is adapted to release latch 187 of the lowest order cam plate 185. To achieve this operation, the lower edge of slide 198 is provided with a cam edge 198b which is normally located to the rear (Figs. 7 and 23) of a pin 187b extending toward the right below link 198 from the lowest order latch 187. Upon forward movement of link 198, cam edge 198b will engage pin 187b thereby rocking latch 187 counterclockwise against the tension of its spring from engagement with shoulder 185a of the associated cam plate 185.

Figure 20:
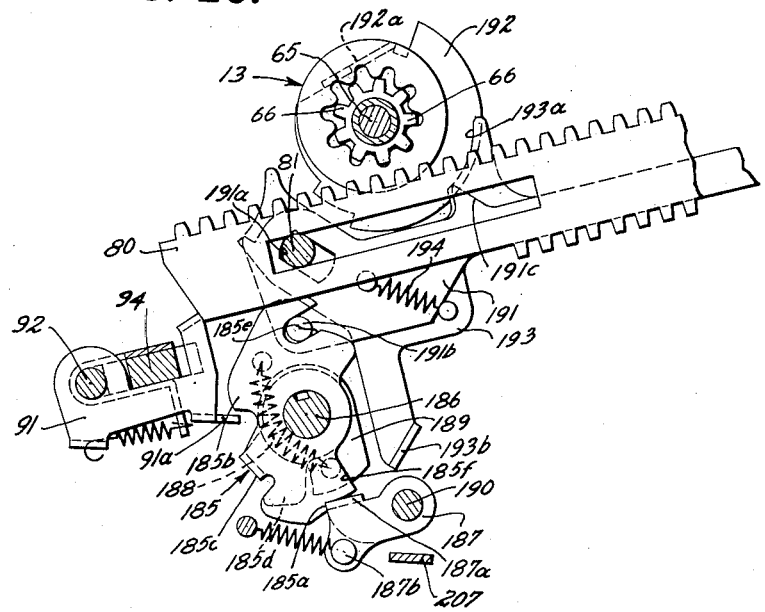
Fig. 20 is a fragmentary right side view of the total taking mechanism in normal position.
Figure 21:
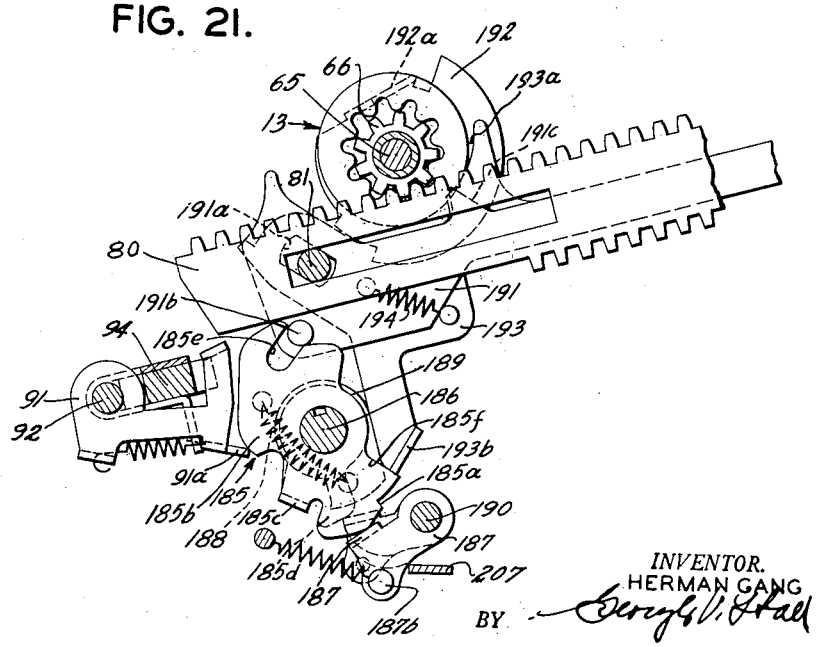
Fig. 21 is a fragmentary right side view of the total taking mechanism in an operated position.

The lowest order plate 185, upon release from the restraint of its latch 187, will be rotated counterclockwise by its spring 188 from the position shown in Fig. 20 to the position of Fig. 21. Upon counterclockwise movement of plate 185, its forward cam edge 185*b* will engage the rearwardly extending lug 91*a* of the associated latch 91 thereby rocking said latch clockwise and releasing the associated actuator rack 80. Furthermore, during the above counterclockwise movement of plate 185, its cam slot 185*e* engaging pin 191*b* of the associated total plate 191 will move said plate upwardly at an angle from the position shown in Fig. 20 to the position show in Fig. 21. During the above adjustment of total plate 191, release plate 193 will also be moved accordingly by the connecting spring 194. This simultaneous adjustment of parts 191 and 193 will move the total hook 191*c* and the cam edge 193*a* into the path of rotation of lug 192*a* of plate 192 of the lowest order unit of the accumulator. In the upward adjustment of plate 193, lug 193*b* at the end of its downwardly extending arm will be raised above the path of movement of shoulder 185*a* of plate 185 and into the path of movement of the rear edge 185*f* thereof. Consequently, cam plate 185 will be arrested in its counterclockwise movement by engagement of lug 193*b* by edge 185*f*. In addition to the above adjustments upon counterclockwise rotation of cam plate 185, nose 185*d* extending toward the left therefrom will be moved to a position immediately adjacent the forward edge of latch 187 of the next higher order control cam plate 185 as shown in Fig. 21.

With the parts in the above-described adjusted positions, lowest order rack 80 released from restraint of its latch 91 will be moved forwardly as the associated rack 85 is moved toward the rear under the urge of its spring. Forward movement of rack 80 will rotate accumulator gear 66 engaged therewith clockwise until lug 192*a* is brought into engagement with cam edge 193*a* of release plate 193. This engagement with cam edge 193 will occur as lug 192*a* immediately approaches engagement with total hook 191*c*. Therefore, as lug 192*a* moves into engagement with total hook 191*c*, as shown in Fig. 22, release plate 193 will be cammed downwardly against the tension of spring 194 as total plate 191 is held in raised position by plate 185 through pin 191*b* on plate 191. This adjustment of release plate 193, as the accumulator wheel moved to zero position, will lower lug 193*b* from engagement with rear edge 185*f* of cam plate 185 and into the path of movement of shoulder 185*a*. Plate 185 will therefore be afforded a second step of movement which will be terminated by engagement of shoulder 185*a* with lug 193*b*.

In the second step of movement of plate 185 nose 185*d* thereof will engage and rock the next higher order latch 187 counterclockwise as shown in Fig. 22 thereby releasing the next higher order cam plate 185. Furthermore, during this second step of movement of plate 185, the rear edge of the rightwardly extending strip 185*c* thereof will be moved to a position into engagement with the forward edge of the associated arm 188 which is keyed on rock shaft 186.

The release of the next higher order cam plate 185 will initiate the total taking operation in that order, and thus the operation will be extended across the machine from lower to higher orders as rapidly as the successive orders of the actuators are moved to zero position. Upon counterclockwise movement of the highest order cam plate 185 in the total taking operation, means is provided to release clutch lever 205 from the restraint of finger 204, thereby permitting counterclockwise movement of said lever by its spring to reengage clutch 18 to complete its cycle of operation.

The means operable to release clutch lever 205 comprises a bail 207 (Figs. 23 and 24) having pivotal mounting at its ends on shaft 190 on which finger 204 and latches 187 are also mounted. At its right end bail 207 has an upwardly extending arm having a lug 207*a* at its end and positioned to the rear of shoulder 204*c* of arm 204*b* which has connection with finger 204 by cross strip 204*a*. At its left end bail 207 has link connection 208 with the highest order cam plate 185. Upon counterclockwise movement of the highest order cam plate 185 in the total taking operation, link 208 will rock bail 207 counterclockwise on shaft 190. During the second step of counterclockwise movement of plate 185, lug 207*a* of bail 207 will engage shoulder 204*c* thereby rocking the connected finger 204 counterclockwise against the tension of its spring. Counterclockwise movement of finger 204 will remove it from restraining position beneath the end of arm of clutch lever 205 which will be spring moved counterclockwise to normal thereby releasing clutch pawl 20 to reengage clutch 18.

During the operation of clutch 18 as it completes its first half cycle of operation, the actuator rack drive will move column latches 91 toward the front of the machine where they will be rocked counterclockwise by their springs to their normal counterclockwise position as they move forwardly of the ends of actuator racks 80. Furthermore, during operation of the actuator rack drive to move latches 91 to their forward position, cam 200 will be rotated to reengage its high portion with follower 199. The timing of this operation is shown by graph line (*n*) of Fig. 29B. Follower 199 will therefore be rocked clockwise to normal and will move link 198 toward the rear and rock bell crank 197 counterclockwise to position its arm in normal position below the end of bell crank 196 of total slide 195. It will be observed that total key 6 will be held depressed by the overlying lug of the cam slot of plus/minus slide 144 until clutch 18 completes its cycle of operation thereby releasing yoke 28 and permitting said slide to be restored. Consequently, slide 195 will remain in operated position with slide 144 until the release of key 6.

During the midcycle dwell of the actuator rack drive the printing mechanism will be operated, as described in connection with additive or subtractive operation of the machine, thereby printing the total taken from the zeroized accumulator and registered on type wheels 16. Furthermore, during the midcycle dwell of the actuator rack drive, shaft 186 is rocked to restore cam plates 185 clockwise. Means for rocking shaft 186 comprises an arm 211 (Figs. 1 and 5*c*) fast at its right end. Arm 211 has link connection 212 with a cam follower 213 which is spring biased into engagement with a cam 214 fast on main drive shaft 22. Normally cam follower 213 engages the high portion of cam 214 and is thereby held counterclockwise to hold shaft 186 in like counterclockwise position. During the midcycle dwell of the actuator rack drive, cam 214 will be moved to engage its low portion with cam follower 213. Cam follower 213 will therefore be rocked clockwise and likewise rock shaft 186 and restore arms 189. It will be recalled that cross members 185*c* of plates 185 will be moved into engagement with arms 189 (Fig. 22) upon counterclockwise movement of plates 185. Therefore, upon clockwise movement of shaft 186, arms 189 will be effective to rotate plates 185 simultaneously clockwise to normal position where they will be reengaged and held by the respective latches 187. The timing of this operation is shown by graph line (*o*) Fig. 29B.

After the midcycle dwell of the actuator rack drive, latches 91 will be restored toward the rear of the machine thereby engaging the respective ends of racks 80 to restore said racks to their normal rear position. The return stroke of racks 80 will be idle in operation as described in connection with the subtractive operation of the machine. During the return stroke of racks 80, cam 214 will be rotated to reengage its high portion with follower 213 thereby restoring shaft 186 to normal counterclockwise position (Fig. 20) and tensioning springs 188 between arms 189 and plates 185. In the clockwise movement of plates 185 to their normal position total plates 191 and release plates 193 will be restored downwardly by cam slots 185e thereby removing total hooks 191c and cam edges 193a from the path of rotation of lugs 192a of the respective orders of the accumulator.

A subtotal operation differs from the aforedescribed total taking operation by provision of means to maintain engagement of accumulator gears 66 with racks 80 during their return strokes. The values removed during the forward movement of racks 80 will therefore be restored. To provide for this operation, depression of subtotal key 7 (Figs. 2, 7 and 8) is adapted to adjust slide 152, described in connection with non-add and correction in addition to adjusting slides 144 and 195 as described in connection with the total taking operation. It will be recalled that slide 152 is adjusted toward the front of the machine in connection with correction or non-add operation of the machine and that such adjustment provides for engagement of accumulator wheels 66 with actuator racks 80 during their rearward return strokes. Adjustment of this slide therefore will operate to return the values removed in the forward strokes of said racks in the subtotal operation which otherwise is identical with that of the total taking operation. The adjustment of the registration control means for the subtotal operation is shown in Fig. 17d.

True negative total (general description)

A negative total is registered in crawl carry accumulator 13 (Figs. 1 and 4) as the complement of the true negative total. In prior art listing machines having crawl carry accumulators, the method of converting a complemental negative total to a true negative total and then printing it involves three subtractive cycles of machine operation and two total setting actions of the zeroizing devices. This method is fully disclosed in Patent #2,645,417 to which reference is made for a detailed disclosure of the principles of operation. Briefly this method provides, in the first cycle, for zeroizing the accumulator by the actuator racks thereby adjusting storage devices respectively in accordance with the subtracted complemental values and for disabling the printing mechanism; for controlling the actuator racks during the second cycle in subtractive excursions under control of the storage devices respectively thereby registering the true negative total by subtracting the complement of the negative total from the zeroized accumulator; and for zeroizing the accumulator and reenabling the printing mechanism to print the true negative total during the third cycle.

The above outlined principles of operation are employed in a true negative total taking operation in the machine of the present disclosure, but modified by utilization of the double stroke registration to expedite the operation. The use of the double stroke registration permits performance of the operation by two machine cycles and eliminates the necessity of storage devices for the complemental negative total.

In a negative total taking operation, the operation is initiated in response to depression of total key 6, and the successive higher orders of accumulator 13 will be zeroized as described in connection with a total taking operation. It will be recalled that the highest order of the accumulator comprises an overflow unit which receives only tens transfer from the next lower order, which order is the highest in which digital registration is effected. If the accumulator has been overdrafted, i.e., a complemental negative total is registered therein, the zeroizing operation will include a complemental nines registration carried to the highest order of the accumulator. Movement of the highest order actuator rack 80 from the eighth to the ninth zeroizing position is operable to engage a program clutch 220 (Figs. 5b, 25 and 27) included in the devices operable to convert a complemental negative total to a true negative total.

Figure 27:
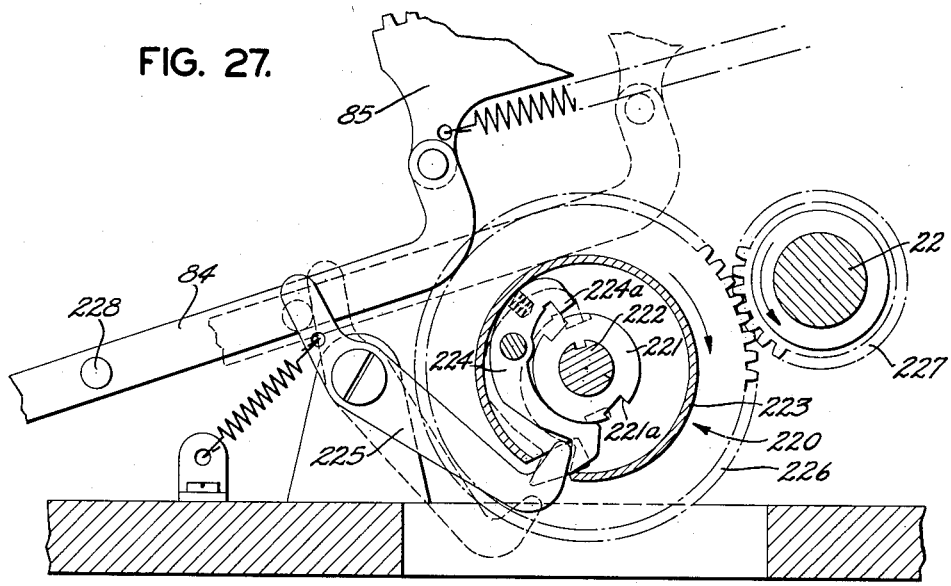
Fig. 27 is a fragmentary section taken on line 27—27 of Fig. 25.

Program clutch 220 comprises a driving member 221 rotatably mounted on a cross shaft 222 which is journaled in the machine framing and on which the driven member 223 of said clutch is fast. The drive is transmitted from driving member 221 to driven member 223 by a spring urged pawl 224 of well-known construction which is adapted for engagement with one or the other of a pair of oppositely disposed recesses 221a in the periphery of driving member 221. Normally pawl 224 is held in clutch disengaging position by engagement of a spring biased detent 225 (Fig. 27).

Fast with driving member 221 is a gear 226 which is engaged by a gear 227 fast on main drive shaft 22. The driven ratio between gears 226 and 227 is one to two. Therefore, upon two cycles of operation of main clutch 18, program clutch 220, if engaged, will be driven one cycle. It will be noted that, when the machine is in normal full cycle position, one of the recesses 221a of driving member 221 of the program clutch is positioned counterclockwise (Fig. 27) adjacent the effective nose 224a of pawl 224. As described in connection with a total taking operation, main clutch 18 is given a step of movement and then its operation is interrupted by auxiliary clutch lever 205 (Fig. 7). This step of movement of main clutch 18 will step driving member 221 of program clutch 220 clockwise to bring the adjacent recesses 221a thereof into the angular position of nose 224a of pawl 224 of the driven member of said program clutch.

Upon movement of the highest order actuator rack 80 from its eighth to its ninth position as an incident to a total taking zeroizing operation in which the accumulator is overdrafted, a pin 228 (Figs. 5b, 25 and 27) on stop arm 84, which is carried toward the rear by the associated rack 85, will engage and rock clutch detent 225 clockwise thereby releasing pawl 224. Consequently, nose 224a of released pawl 224 will drop into the aligned recess 221a of driving member 221 to engage program clutch 220. At approximately the same time, the highest order cam plate 185 (Fig. 23) will be rocked to reengage main clutch 18 as described in connection with a total taking operation and the now engaged program clutch 220 will be driven therewith.

Means comprising a negative total control cam unit 230 (Figs. 5d, 25, 26 and 28) is driven by program clutch 220 to control mechanism operable in connection with the negative total taking operation. Cam unit 230 is splined for axial adjustment on shaft 222 which is driven by the program clutch. The axial adjustment, however, is not concerned with the negative total operation but only with a negative subtotal operation hereinafter described. Cam unit 230 controls mechanisms to perform certain operations in connection with a negative total operation and identified alphabetically below for simple reference.

(a) Means is adjusted to prevent disengagement of main clutch 18 until the end of a second cycle of operation.

(b) The registering mechanism is adjusted for subtractive double stroke registration for the first of the two cycles of operation; the second subtractive cycle being single stroke wherein the return stroke of actuator racks 80 is idle.

(c) The printing mechanism is disabled for operation during the first cycle and enabled for operation during the second cycle.

(d) Symbol slide 175 (Figs. 5b and 28) is readjusted from the total taking position to a negative total taking position so that symbol wheel 16a will be readjusted to bring the appropriate symbol to printing line position.

Cam unit 230 is splined on shaft 222 below the forward end of symbol slide 175 and is constituted by a cylindrical body portion, the peripheral surface 230a of which functions as a dwell common to a plurality of cams comprising the unit. Normally the unit is yieldably held in a leftmost position by a spring 235 (Fig. 25) against a stop comprising a collar 229. At the right end of unit 230 is a first cam having a high dwell constituted by surface 230a and a low dwell 230b. Spaced toward the left from the first cam is a second cam having a low dwell constituted by surface 230a and a high dwell comprising a lobe 230c. At the left end and extending radially inward of the cam unit is a recess 230d (Figs. 5d, 26 and 28) which is associated with cam means hereinafter described in connection with a negative subtotal operation. A third cam includes a rise 230e extending counterclockwise from recess 230d to peripheral surface 230a which comprises the high dwell of the cam.

*True negative total (control of registration)*

Figure 28:
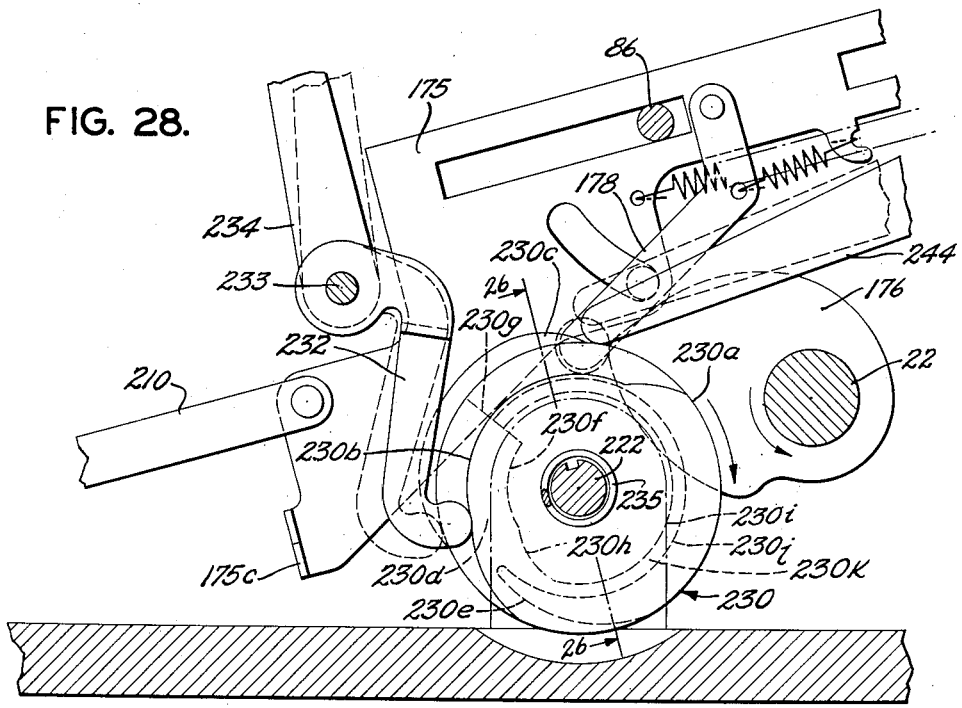
Fig. 28 is a right side elevation of the parts shown in Fig. 25.

A cam follower comprising a depending arm 232 (Figs. 5d, 12a, 25 and 28) is fast at its upper end on a shaft 233. Normally, the lower end of follower 232 is engaged by low dwell 230b of the first cam at a point of rise toward high dwell 230a as shown in Figs. 5d and 28. Shaft 233 extends toward the right and outwardly of the right side frame. An upstanding arm 234 is fast at its lower end on shaft 233 exteriorly of the right side frame, and its free upper end normally engages the forward edge of the leftwardly extending arm 28b (Figs. 12 and 12a) at the lower end of main clutch control yoke 28.

A roller 234a is mounted at the rear and adjacent the upper end of arm 234. Roller 234a engages a cam surface at the upper edge of the front end of a rearwardly extending arm 236 which is fast at its rear on a shaft 237. Shaft 237 extends inwardly of the right side frame and fast thereon at its lower end is an upstanding arm 238, the upper end of which is to the rear of registration sign control slides 120 and 133. A link 239 extends forwardly from the upper end of arm 238 and at its front end has pivotal connection via a collar 240 with the right end of a leftwardly extending link 241 which at its left end has pivotal connection with the rear edge of slide 133. Shaft 237, arms 236 and 238 are spring biased clockwise and normally roller 240 engages a cam recess 242a (Figs. 3 and 12) at the front edge of a fixed rail 242 which extends across the machine. This serves to locate sign control slide 133 in centralized position with sign control cams 130a and 130b in ineffective positions (Fig. 13) at the respective sides of cranks 131. Furthermore, arm 234 will be held counterclockwise by the cam edge of arm 236 in engagement with roller 234a (Fig. 12a).

It will be recalled that cams 130a and 130b are operable in conjunction with single stroke registration cams 116a and 116b to effect double stroke registration. Normally, however, cams 130a and 130b are held in disabled position as described above and cams 116a and 116b are independently adjustable to effective positions by slide 120 in accordance with the respective additive or subtractive operation of main clutch engaging yoke 28. Means for connecting slide 133 for adjustment in accordance with the adjustment of slide 120 for double stroke registration is effected by counterclockwise movement of arm 238 from its normal position shown in Figs. 12 and 12a. Counterclockwise movement of arm 238 will remove collar 240 from engagement with centralizing recess 242a of rail 242 and into engagement with a cam recess 120b at the rear edge of slide 120. Thus, slide 133 will be connected with slide 120 through link 241 and thereupon adjusted in accordance with the adjusted position of slide 120.

The initial clockwise rotation of cam unit 230 by program clutch 220 will remove low cam dwell 230b from engagement with follower 232 and high surface 230a therewith. This will rock follower 232, shaft 233 and arm 234 clockwise from the positions shown in the drawings. This operation will be effected during the time in the first half of the current cycle of main clutch 18 during which the column latches 91 of the actuator rack drive are being moved toward their forward position. Clockwise movement of arm 234 will adjust the mechanisms for the operations outlined under (a) and (b) as follows:

Yoke 28 is rocked, upon depression of total key 6, clockwise to subtractive position from the normal position of Fig. 12 to engage main clutch 18. This will remove left arm 28b of the yoke 28 from engagement with arm 234. Clockwise movement of arm 234 will reengage it with arm 28b to hold yoke 28 in its subtractive rocked position. At the time main clutch 18 immediately approaches full cycle position, arm 234 will still be held in rocked position by cam surface 230a. Therefore, when clutch lever 27 is rocked to clutch disengaging position by pin 21a as the clutch approaches full cycle position, arm 28a of yoke 28 will not be moved to position to hold said lever in clutch disengaging position. As a result, when pin 21a releases lever 27 as the clutch moves to full cycle position, said lever will be rocked from clutch disengaging position. Main clutch 18 will therefore continue without interruption in a second cycle of operation. The timing of this operation is shown by graph line (p) Fig. 29B.

Figure 17E:
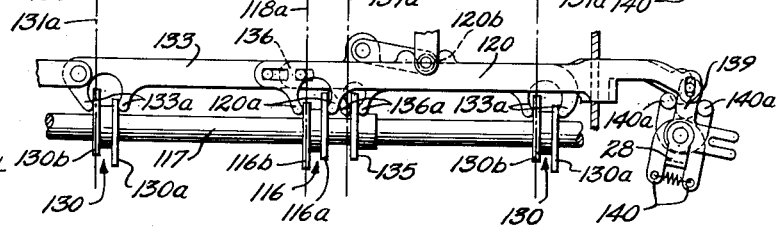

The clockwise movement of arm 234 will cause roller 234a to rock arm 236, shaft 237 and arm 238 counterclockwise from the position shown in Figs. 12 and 12a. This will adjust double stroke sign control slide 133 in accordance with the subtractive setting of slide 120 as heretofore described. This adjustment of the slides is shown in Fig. 17e. As was noted in the foregoing, arm 234 is rocked during the first half of the first machine cycle. Therefore, as racks 80 are restored toward the rear by latches 91 of the actuator rack drive in the last half of the first machine cycle, the racks will drive accumulator gears 66 through reversing gears 82 with which said gears will be engaged. The extent of the return strokes of racks 80 respectively will be the same as their forward zeroizing strokes in the total taking operation. Therefore, the complemental negative values which were subtracted to zeroize the accumulator will be subtracted from said zeroized accumulator. This will register the true negative total in the accumulator.

The second cycle of operation of the main clutch will now operate to take a total as described in connection with the usual total taking operation. During the first half of this second cycle, cam surface 230a of cam unit 230 will be removed from engagement with follower 232 and low cam surface 230b will be reengaged. Therefore, arm 234 will be restored counterclockwise to normal. As a result, yoke 28 will not be restrained from movement to centralized position and clutch lever 27 will be held in position to disengage clutch 18 at the end of the cycle. Furthermore, when arm 234 is restored, double stroke slide 133 will be uncoupled from slide 120 and will be moved to neutral position. Thus, during the second half of the cycle, actuator racks 80 will be restored idly to their rear position as in the usual total taking operation. The timing of the registration during the two cycles of operation is shown by graph line (p) of Fig. 29B.

Although the drive ratio between main clutch 18 and program clutch 220 (Fig. 27) is two to one, program clutch 220 will not have completed a cycle of operation when main clutch 18 is disengaged at the completion of the two cycles of operation. This is because the program clutch is not engaged upon initial operation of the main clutch; but only when an overdraft is detected upon zeroizing of the accumulator and at which time the operation of the main clutch has been interrupted after the initial step of operation. The program clutch will therefore remain engaged with pawl 224 counterclockwise from the position shown in Fig. 27. The next time the machine is operated following a negative total taking operation, detent 225 will be effective to disengage the program clutch when the main clutch is rotated to the position where it was interrupted in said prior negative total taking operation and in which position the program clutch was engaged. When the main clutch is disengaged in full cycle position after this subsequent operation, the program clutch will be angularly displaced as shown in Fig. 27. If the subsequent operation is a negative total taking operation, through inadvertence, the program clutch will be disengaged when the operation of the main clutch is interrupted and then reengaged when the overdraft is indicated.

A cam follower comprising a lever 244 (Figs. 5d, 18 and 25) is operable to control the printing mechanism for the negative total operation. Normally one end of lever 244 is engaged by cam surface 230a. The opposite end of lever 244 extends upwardly to the front of a lug at the lower free end of a depending arm 177c of latch lever 177. Upon initial rotation of cam unit 230, lobe 230c will engage and rock follower 244 clockwise. Upon clockwise movement, follower 244 will engage arm 177c and restore latch lever 177 which will have been released by rearward movement of symbol rack 175a. This operation to disable the printing mechanism will occur before the midcycle dwell of the actuator rack drive during which time a printing operation would normally be effected. During the return stroke of the actuator rack drive, cam unit 230 will be rotated to reengage cam surface 230a with follower 244. Therefore, the printing mechanism will be afforded its normal operation and the true negative total will be printed during the sacond machine cycle. However, the symbol slide 175 will have been readjusted, as hereinafter described, to bring the appropriate symbol of wheel 16a to printing line position. the timing of the printing operation is shown by graph line (q) Fig. 29B.

*True negative total (symbol printing control)*

It will be recalled with reference to the section entitled "Printing Mechanism (Symbol Printing)" that symbol wheel 16a is adjusted to bring the appropriate type to printing line position by a symbol rack 175a upon rearward movement of a slide 175 (Figs. 5b, 5d and 28). The extent of the rearward movement of slide 175 is controlled by engagement of a plate 179 (Figs. 8 and 9) with the stem of the depressed operating key. To briefly review the operation of this mechanism, a control cam 176 (Fig. 28) on main drive shaft 22 engages a yieldable follower 178 and during the first part of a machine cycle permits movement of slide 175 toward the rear to a position controlled by symbol plate 179 in cooperation with the stem of the depressed operating key. After the printing operation cam 176 is operable to restore the parts.

The rearward movement of slide 175 as an incident to a total taking operation will position a lug 175c at its forward end partially within recess 230d (Figs. 5d and 28) of cam unit 230. With slide 175 in this position symbol wheel 16a is positioned to locate a symbol at printing line position which indicates a total. When the total taking operation is converted to a negative total operation, means is provided to readjust slide 175 to bring a symbol for this operation to printing line position. To this end, lug 175c is positioned in the path of movement of cam rise 230e when slide 175 is adjusted as described above for the total taking operation. This adjustment of slide 175 and lug 175c will be effected before cam unit 230 has rotated in the negative total taking operation to bring cam rise 230e into engagement with said lug 175c.

During rotation of cam unit 230, cam rise 230e will engage lug 175c and as the unit further rotates said lug will be engaged with high portion 230a. The timing of this operation is shown by graph line (r) Fig. 29B. This operation will restore slide 175 one step toward the front of the machine and will operate to readjust symbol wheel 16a to bring an appropriate type for the negative total operation to printing line position. Furthermore, this operation will occur before the time at which the printing mechanism is normally operated. As heretofore described, however, the printing mechanism will be disabled during this first cycle of operation of the main clutch 18 and slide 175 will be restored to its normal forward position. During the second cycle of operation of main clutch 18 cam surface 230a will be in the path of rearward movement of lug 175c as slide 175 is moved toward the rear. Therefore, when the printing mechanism is operated during this cycle of the main clutch the appropriate negative total symbol will be printed.

*True negative subtotal*

The true negative total, previously described, employs two machine cycles to effect three subtractive operations of actuator racks 80. The double stroke registration is employed in the first cycle to effect two of the subtractive operations, and then the double stroke control devices are restored so that the second machine cycle employs the usual single stroke registration to effect the third subtractive operation. The third subtractive operation which takes the true negative total from the accumulator is effected by the forward zeroizing excursions of racks 80 which are returned idly from their forward excursions. The present invention provides means to take a true negative subtotal by extending the double stroke registration for operation in the second machine cycle. The return strokes of actuator racks 80 in said second machine cycle, therefore, will be effective to subtract the true negative total from the zeroized accumulator. Thus, the accumulator will be restored to its original state wherein the negative total is registered complementally.

To take a true negative subtotal, cam unit 230 is operable in conjunction with symbol slide 175 to extend the double stroke registration for operation in a second machine cycle which is instituted by operation of cam unit 230 in the same manner as described in connection with the true negative total operation. The true negative subtotal operation is identical to the previously described true negative total operation except for operation of the means for extending the double stroke operation and for adjustment of the symbol mechanism. Additionally, however, in order to convert a subtotal operation to a true negative subtotal operation, means must be provided to disable the setting of slide 152 (Fig. 8) which is set upon depression of subtotal key 7 (Fig. 7) to provide for additive operation upon the return stroke of racks 80 in the subtotal operation The timing of the registration during the two cycles of operation is shown by the graph line (p) of Fig. 29B.

The base of recess 230d at the left end of cam unit 230 comprises a low cam dwell constituted by surface 230f (Figs. 5d, and 28). Cam surface 230f extends counterclockwise from a radially disposed end wall 230g of recess 230d to a cam rise comprising the surface 230h. Cam rise 230h extends counterclockwise to a high cam dwell comprising the concentric surface 230i which extends counterclockwise to end wall 230g and is thereby connected with recess 230d. Concentric with high cam dwell 230i and spaced radially outward therefrom is a retaining surface 230j which extends clockwise from end wall 230g to a point of connection at an acute angle with the outer cam rise 230e described in connection with the negative total operation. The above-described surface 230h, 230i in opposition to surface 230j defines an open end cam slot 230k in the left face of unit 230.

A thrust cam is defined by the bottom face 230m (Figs. 26 and 28) of cam slot 230k. Cam face 230m includes a low dwell, a rise, and a high dwell. The low dwell of cam face 230m extends counterclockwise from recess 230d to the cam rise and the high dwell of the face extends counterclockwise from the rise to the end wall 230g.

If there is a complemental negative total in accumulator 13, the negative subtotal operation will institute by engagement of program clutch 220 in the same manner as described in connection with the negative total operation. Symbol slide 175, however, will be in a different adjusted position with respect to cam unit 230. That is, the slide will be in position to adjust symbol wheel 16a to bring the appropriate subtotal type to printing line position. This adjusted position of symbol slide 175 controls operation of cam unit 230 to perform the aforenoted operations of the negative subtotal as distinguished from the negative total operations.

Symbol slide 175 is adjusted toward the rear under control of subtotal key 7, during the initial step of movement of main clutch 18 and before interruption of its operation, two steps of movement beyond the position to which it is adjusted under control of total key 6. It will be recalled that when slide 175 is adjusted under control of total key 6, lug 175c thereof is in the path of movement of cam rise 230e. The two additional steps of movement toward the rear under control of subtotal key 7 will position lug 175c immediately adjacent low cam dwel 230f and in the path of movement of cam rise 230h. Furthermore, the right end of lug 175c will be immediately adjacent the low dwell of cam face 230m and in the path of movement of the rise of said cam face.

Upon initial rotation of cam unit 230 by program clutch 220, follower 232 will be rocked by the rise between low cam dwell 230b and the high cam dwell comprising surface 230a as described in connection with the negative total operation. Arm 234 which is rocked with follower 232 will engage arm 28b to prevent yoke 28 from being restored and will rock arm 236 to adjust the machine for double stroke registration as described in connection with the negative total operation. Furthermore, arm 234 will engage arm 150b (Fig. 12) and restore yoke 150, slide 136 and cam wheel 135 which were set to provide for additive operation of actuator racks 80 on the return stroke in the usual subtotal operation. To permit this restoring operation, link 151 which connects arm 150b and slide 152 (Fig. 8) includes a pair of longitudinally yieldable sections which are normally spring held in retracted position. This provision is necessary because slide 152 will be held in operated position until release of subtotal key 7 by plus minus slide 144 at the end of the second machine cycle.

Also during the initial rotation of cam unit 230, cam slot 230k and high cam dwell 230i (Figs. 5d and 28) will be moved into engagement with lug 175c of symbol slide 175. During this operation, cam rise 230h will engage lug 175c and restore slide 175 one step of movement toward the front of the machine. This movement will readjust symbol wheel 16a to bring the appropriate negative subtotal type to printing line position.

During this second half of each machine cycle, cam 176 is normally operable to restore symbol slide 175. The symbol slide, however, will be restrained from such movement by engagement of cam slot 230k with lug 175c. Yieldable cam follower 178 therefore will be rotated clockwise with respect to restrained slide 175 by restoring cam 176. During the dwell of the actuator rack drive at the end of the second cycle of the machine drive, cam slot 230k will be moved clockwise from engagement with lug 175c. The released slide 175 will now be restored forwardly by counterclockwise movement of yieldable follower 178 as said follower is restored. The timing of the symbol slide for the negative subtotal operation is shown by graph line (s) Fig. 29B.

It will be recalled that in the negative total operation cam follower 232 is rocked clockwise to enable the double stroke registering mechanism and that said follower will be held rocked by cam dwell 230a. Furthermore, it will be recalled that the cam follower will be restored by reengagement with low cam dwell 230b during the first half of the second machine cycle so that the return stroke of actuator racks 80 will be idle. In the negative subtotal operation, cam face 230m comprising the bottom of cam slot 230k in conjunction with lug 175c of symbol slide 175 is operable to prevent cam follower 232 from being restored until the dwell of the actuator rack drive following the return stroke at the end of the second machine cycle. The return strokes of racks 80 will therefore subtract the true negative total from zeroized accumulator 13 to reenter the original complemental value therein.

Figure 25:
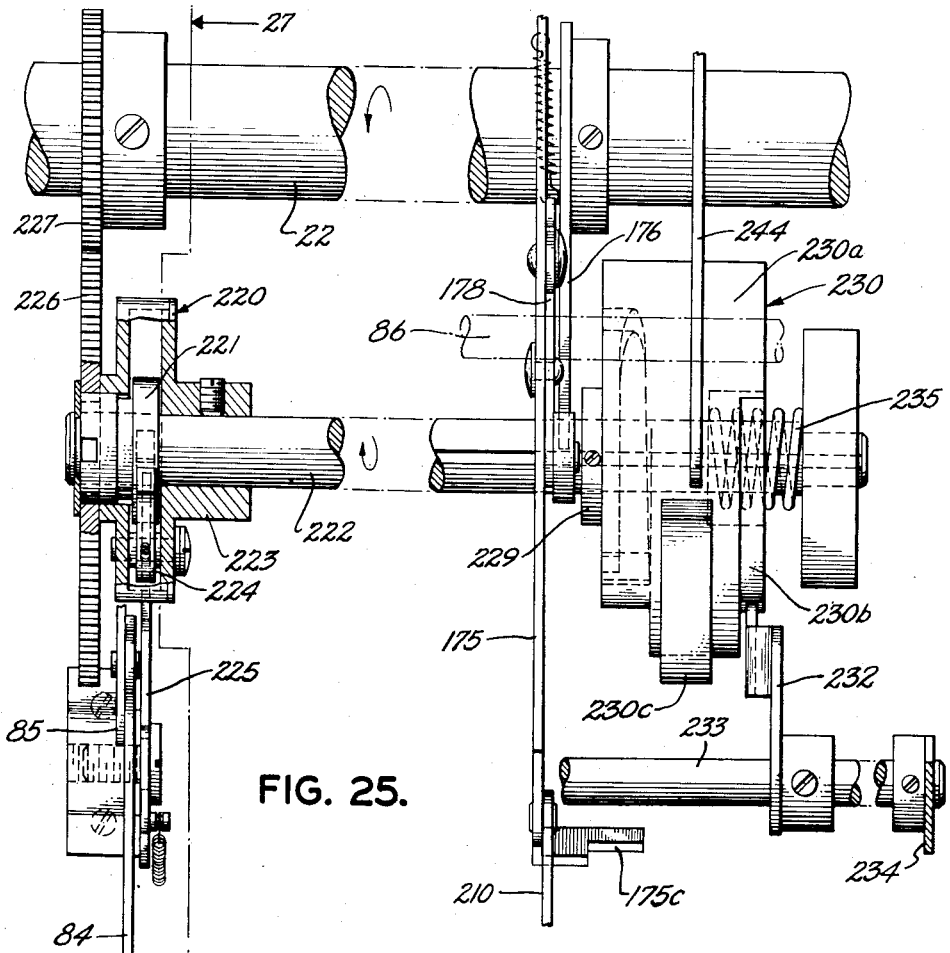
Fig. 25 is a top plan of the program clutch and cam unit operable in connection with negative total taking operations.
Figure 26:
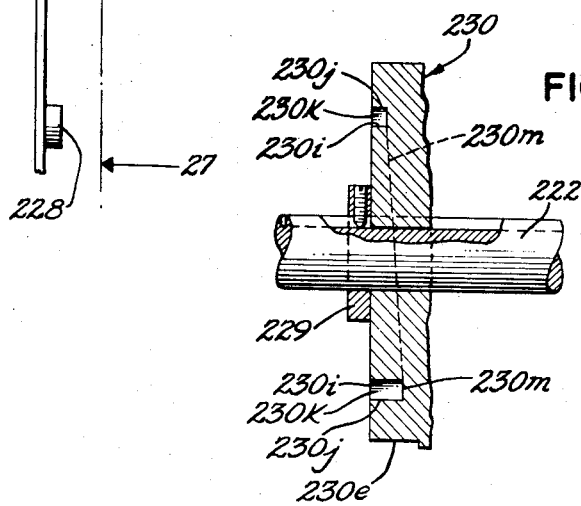
Fig. 26 is a fragmentary section of the cam unit taken on line 26—26 of Fig. 28.

During the last half of the first machine cycle and the first half of the second machine cycle, cam unit 230 will be rotated to move the low dwell of cam face 230m (Figs. 26 and 28) comprising the base of cam slot 230k from engagement with the right end of lug 175c of slide 175 and engage the high dwell of said cam face 230m therewith. During this operation the cam rise between the low and high dwells of said cam face 230m will be effective to exert a side thrust on cam unit 230 and slide said unit toward the right on shaft 222 against the tension of spring 235 (Fig. 25). Before movement of unit 230 toward the right, follower 232 will be engaged and held rocked by high cam dwell 230a and will be in the vertical plane of low cam dwell 230b with which it is normally engaged. However, the adjustment of cam unit 230 to the right will move low cam dwell 230b from the vertical plane of follower 232. Therefore, follower 232 will not be reengaged by low cam dwell 230b to disable the double stroke registration control during the return stroke of racks 80 as described in connection with the negative total operation; but will remain engaged with high cam dwell 230a until the dwell of the actuator rack drive at the end of the second machine cycle.

During the final dwell of the actuator rack drive, cam unit 230 will be rotated to disengage cam slot 230k with lug 175c of symbol slide 175. This will disengage the high dwell of cam face 230m from the end of lug 175c thereby releasing cam unit 230 to be restored to the left by spring 235. Upon movement of the cam unit to its normal left position, high dwell 230a will be moved from engagement with follower 232 and low cam dwell 230b will be moved into the vertical plane thereof. Follower 232 will therefore be restored counterclockwise to engage low dwell 230b, and as a result main clutch 18 will be disengaged at the end of the cycle as heretofore described and the double stroke registration control will be disabled.

I claim:

1. In a machine of the class described having a register including an ordinal series of register wheel gears; the combination of, reciprocatory cyclically operable actuating means for said gears, adjustable means for engaging and disengaging said actuating means and gears, said adjustable means being adjustable to a first engaging position wherein said gears will be rotated in a given direction during the initial stroke and in the reverse direction during the return stroke of a cycle of said actuating means, to a second engaging position wherein said gears will be rotated in said given direction during said return stroke and in said reverse direction during said initial stroke of said cycle, and to a disengaging position wherein said actuating means is idly operable, and control means selectively operable to effect two of said adjustments or said three adjustments of said adjustable means successively in timed relation with a cycle of said actuating means.

2. The invention according to claim 1, said control being selectively operable to effect one of said engaging adjustments and said disengaginng adjustment, or said two engaging adjustments and said disengaging adjustment of said adjustable means successively in timed relation with said cycle of said actuating means.

3. In a machine of the class described having a register including an ordinal series of register wheel gears; the combination of, reciprocatory cyclically operable actuating means for said gears, adjustable means for engaging and disengaging said actuating means and gears, said adjustable means being adjustable to a first engaging position wherein said gears will be rotated in a given direction during the initial stroke and in the reverse direction during the return stroke of a cycle of said actuating means, to a second engaging position wherein said gears will be rotated in said given direction during said return stroke and in said reverse direction during said initial stroke of said cycle, and to a disengaging position wherein said actuating means is idly operable, cyclically operable drive means for reciprocating said actuating means including an initial dwell prior to the initial stroke of said actuating means, a midcycle dwell between the initial and return strokes of said actuating means and a terminal dwell subsequent to the return stroke of said actuating means, and control means selectively operable to effect either of two of said three adjustments of said adjustable means during said initial dwell, any one of said three adjustments during said midcycle dwell and the other of said three adjustments during said terminal dwell.

4. In a machine of the class described according to claim 3; printing mechanism including type members adjustable in accordance with the movements of said actuating means and operable during said midcycle dwell of said drive means, and means for disabling said printing mechanism during operation of said actuating means under control of one of said selective operations of said control means.

5. In a machine of the class described according to claim 3; said control means being selectively operable to effect either of said two engaging adjustments of said adjustable means during said initial dwell, any one of said three adjustments during said midcycle dwell and said disengaging adjustment during said terminal dwell.

6. In a machine of the class described having an accumulator register including an ordinal series of register wheel gears; the combination of, actuating means for each of said gears including a rack and a reversing gear engaged with said rack, mounting means for said register adjustable to a first position to engage said register gears with said racks, to a second position to engage said register gears with said reversing gears or to a position to disengage said register gears, cyclically operable drive means for reciprocating said racks including an initial dwell prior to the initial stroke of said racks, a midcycle dwell between the initial and the return strokes of said racks and a terminal dwell subsequent to the return stroke of said racks, and control means selectively operable to adjust said register mounting means to either of two of its three positions during said initial dwell, to any one of its three positions during said midcycle dwell and to the other of its three positions during said terminal dwell.

7. In a machine of the class described according to claim 6; said control means being selectively operable to adjust said register mounting means to either of its engaging positions during said initial dwell, to any one of its three positions during said midcycle dwell and to its disengaging position during said terminal dwell.

8. In a machine of the class described according to claim 7, said selectively operable control means comprising a plurality of adjustable cams for adjusting said register mounting means, drive means for said cams operable in time with said actuator drive means, and means for selectively adjusting said cams.

9. In a machine of the class described according to claim 8, said adjustable mounting means for said register including an adjustable linkage, and wherein said cams are normally displaced from adjusting position with respect to said linkage.

10. In a machine of the class described according to claim 9, said drive means for said cams comprising a rotatably driven shaft on which said cams are splined for axial adjustment.

11. In a machine of the class described having a register including an ordinal series of register wheel gears; the combination of, reciprocatory cyclically operable actuating means for said gears, adjustable means for engaging and disengaging said actuating means and gears, said adjustable means being adjustable to a first engaging position wherein said gears will be rotated in a given direction during the initial stroke and in the reverse direction during the return stroke of a cycle of said actuating means, to a second engaging position wherein said gears will be rotated in said given direction during said return stroke and in said reverse direction during said initial stroke of said cycle, and to a disengaging position wherein said actuating means is idly operable, cyclically operable drive means for reciprocating said actuating means including an initial dwell prior to the initial stroke of said actuating means, a midcycle dwell between the initial and return strokes of said actuating means and a terminal dwell subsequent to the return stroke of said actuating means, devices driven in time with said drive means and adjustable to positions operable to effect adjustment of said adjustable means, an add key and a subtract key, means responsive to depression of one of said keys to initiate operation of said drive means and to adjust said devices to effect adjustment of said adjustable means to said first engaging position during said initial dwell and to said disengaging position during said midcycle dwell of said drive means, means responsive to depression of the other of said keys to initiate operation of said drive means and to adjust said devices to effect adjustment of said adjustable means to said first engaging position during said midcycle dwell and to said disengaging position during said terminal dwell of said drive means, a third operation key and means responsive to depression of said third key to initiate operation of said drive means and to adjust said devices to effect adjustment of said adjustable means to one of said engaging positions during said initial dwell, to the other of said engaging positions during said midcycle dwell and to said disengaging position during said terminal dwell of said drive means.

12. In a machine of the class described according to claim 11; printing mechanism including type members adjustable in accordance with the movements of said actuating means and operable during the midcycle dwell of said drive means, means adjustable to disable said printing mechanism, and means operable in response to depression of said third operation key to adjust said disabling means to disable said printing means for operation during the initiated cycle of said drive means.

13. In a machine of the class described according to claim 12; said drive initiating means responsive to depression of said third operating key being operable to effect plural cycle operation of said drive means in response to single key depression, and said adjusting means for said disabling means being operable to restore said disabling means to render said printing mechanism operable for a subsequent cycle of said drive means.

14. In a machine of the class described having a register adapted to accumulate positive or negative totals including an ordinal series of register wheel gears; the combination with reciprocatory cyclically operable actuating means for said gears, adjustable means for engaging and disengaging said actuating means and gears, said adjustable means being adjustable to a first engaging position wherein said gears will be rotated subtractively during the initial stroke of a cycle of operation of said actuating means, to a second engaging position wherein said gears will be rotated subtractively during the return stroke of said cycle and to a disengaging position wherein said actuating means is idly operable; of means for registering the true negative total of the complement of a negative total accumulated in said register, comprising means operable to adjust said adjustable means initially to said first engaging position thereby zeroizing said register wheels during the initial stroke of a cycle of operation of said actuating means, and means operable in response to movement of the highest order wheel to zero position to adjust said adjustable means to said second engaging position thereby

37 registering the true negative total in said register wheels during the return stroke of said cycle of said actuating means.

15. In a machine of the class described having a register adapted to accumulate positive or negative totals including an ordinal series of register wheel gears; the combination with reciprocatory cyclically operable actuating means for said gears, adjustable means for engaging and disengaging said actuating means and gears, said adjustable means being adjustable to a first engaging position wherein said gears will be rotated subtractively during the initial stroke of a cycle of operation, to a second engaging position wherein said gears will be rotated subtractively during the return stroke of said cycle and to a disengaging position wherein said actuating means is idly operable, printing mechanism operable between the initial and return strokes of a cycle of operation of said actuating means including type members adjustable in accordance with the movements of said actuating means, and total taking devices comprising, a total key, means operable in response to depression of said key to adjust said adjustable means to said first engaging position and to initiate a cycle of operation of said actuating means thereby zeroizing said register wheels during the initial stroke of said actuating means, and means operable subsequent to said initial stroke to adjust said adjustable means to said disengaging position for idle operation of said actuating means during the return stroke of said cycle; of negative total taking devices operable to change the character of a total taking operation of a negative total registered complementally in response to movement of the highest order register wheel to zero in said operation, comprising means operable to disable said printing mechanism, means operable to adjust said adjustable means to said second engaging position thereby registering the true negative total during the return stroke of said actuating means, means for initiating a second cycle of said actuating means, means for adjusting said adjusting means to said first engaging position thereby zeroizing said register during the initial stroke of said actuating means in said second cycle, means for enabling said printing mechanism thereby printing said true negative total, and means operable subsequent to said initial stroke of said actuating means in said second cycle for adjusting said adjustable means to said disengaging position for idle operation of said actuating means during the return stroke of said second cycle.

16. In a machine according to claim 15; the combination with subtotal taking devices comprising a subtotal key, means operable in response to depression of said subtotal key to adjust said adjustable means to said first engaging position and to initiate a cycle of operation of said actuating means thereby zeroizing said register wheels during the initial stroke of said actuating means, and means operable subsequent to said initial stroke for maintaining adjustment of said adjustable means in said first engaging position thereby restoring said total to said register during the return stroke of said actuating means; of negative subtotal taking devices operable to change the character of a subtotal taking operation of a negative subtotal registered complementally in response to movement of the highest order register wheel to zero in said operation, comprising means operable to disable said printing mechanism, means operable to adjust said adjustable means to said second engaging position thereby registering the true negative subtotal during the return stroke of said actuating means, means for initiating a second cycle of said actuating means, means for adjusting said adjustable means to said first engaging position thereby zeroizing said register during the initial stroke of said actuating means in said second cycle, means for enabling said printing mechanism thereby printing said true negative subtotal, and means operable subsequent to said initial stroke of said actuating means in said second cycle for adjusting said adjustable means to said second engaging position thereby restoring said complemental negative subtotal to said wheels during the return stroke of said actuating means in said second cycle.

17. A machine according to claim 15; said negative total taking devices operable in response to said movement of said highest order wheel to zero including an auxiliary clutch engaged in response to said movement for effecting operation of said enumerated means for changing the character of said total taking operation.

18. In a machine of the class described having a register including an ordinal series of register wheel gears; the combination of, reciprocatory cyclically operable actuating means for said gears, adjustable means for engaging and disengaging said actuating means and gears, said adjustable means being adjustable to a first engaging position wherein said gears will be rotated in a given direction during the initial stroke and in the reverse direction during the return stroke of a cycle of said actuating means, to a second engaging position wherein said gears will be rotated in said given direction during said return stroke and in said reverse direction during said initial stroke of said cycle, and to a disengaging position wherein said actuating means is idly operable, and control means selectively operable to effect two of said adjustments of said adjustable means successively in timed relation with a cycle of operation of said actuating means including one of said engaging positions and said disengaging position, or alternatively both of said engaging positions.

References Cited in the file of this patent
UNITED STATES PATENTS

| | | |
|---|---|---|
| 520,040 | Ehrich | May 22, 1894 |
| 1,218,136 | Vincent | Mar. 6, 1917 |
| 1,558,947 | Teetor | Oct. 27, 1925 |
| 1,957,501 | Horton | May 8, 1934 |
| 2,317,284 | Magnusson | Apr. 20, 1943 |
| 2,590,345 | Reppert | Mar. 25, 1952 |
| 2,701,685 | Parker | Feb. 8, 1955 |

UNITED STATES PATENT OFFICE
CERTIFICATION OF CORRECTION

Patent No. 2,970,755　　　　　　　　　　　　　　February 7, 1961

Herman Gang

It is hereby certified that error appears in the above numbered patent requiring correction and that the said Letters Patent should read as corrected below.

Column 4, lines 13 and 14, for "disangaged" read -- disengaged --; line 68, for "its" read -- is --; column 6, line 46, for "rocmked" read -- rocked --; column 7, line 58, for "until" read -- unit --; line 75, for "guid" read -- guide --; column 13, line 9, for "arms" read -- arm --; line 45, for "199" read -- 119 --; column 15, line 58, for "doublt" read -- double --; column 16, line 16, for "Additive", in italics, read -- Addition --, in italics; column 20, line 7, for "tape" read -- type --; column 22, line 31, for "cnotrols" read -- controls --; column 25, line 11, for "show" read -- shown --; column 31, line 23, for "sacond" read -- second --; column 33, line 15, for "dwel" read -- dwell --; column 34, line 63, for "disengaginng" read -- disengaging --; column 35, line 30, for "termilal" read -- terminal --; column 36, line 50, for "depressino" read -- depression --.

Signed and sealed this 25th day of September 1962.

(SEAL)
Attest:

ERNEST W. SWIDER
Attesting Officer

DAVID L. LADD
Commissioner of Patents